US012591310B2

(12) United States Patent
Yokosaka et al.

(10) Patent No.: US 12,591,310 B2
(45) Date of Patent: Mar. 31, 2026

(54) PSEUDO HAPTIC SENSE PRESENTATION APPARATUS, PSEUDO HAPTIC SENSE PRESENTATION METHOD, AND PROGRAM

(71) Applicant: Ntt, Inc., Tokyo (JP)

(72) Inventors: Takumi Yokosaka, Tokyo (JP); Takahiro Kawabe, Tokyo (JP)

(73) Assignee: NTT, Inc., Tokyo (JP)

( * ) Notice: Subject to any disclaimer, the term of this patent is extended or adjusted under 35 U.S.C. 154(b) by 150 days.

(21) Appl. No.: 18/571,159

(22) PCT Filed: Jun. 23, 2021

(86) PCT No.: PCT/JP2021/023774
§ 371 (c)(1),
(2) Date: Dec. 15, 2023

(87) PCT Pub. No.: WO2022/269799
PCT Pub. Date: Dec. 29, 2022

(65) Prior Publication Data
US 2024/0377887 A1 Nov. 14, 2024

(51) Int. Cl.
*H04B 3/38* (2006.01)
*G06F 3/01* (2006.01)
*G06F 3/0488* (2022.01)

(52) U.S. Cl.
CPC .............. *G06F 3/016* (2013.01); *G06F 3/011* (2013.01); *G06F 3/0488* (2013.01)

(58) Field of Classification Search
CPC ........ G06F 3/016; G06F 3/011; G06F 3/0488; G06F 2203/014; G06F 3/01; G06F 3/0481; G06F 3/0484
See application file for complete search history.

(56) References Cited

U.S. PATENT DOCUMENTS

| | | | | |
|---|---|---|---|---|
| 9,805,514 B1 * | 10/2017 | Benko | ..................... | G06F 3/011 |
| 10,365,719 B2 * | 7/2019 | Mellor | .................... | H04L 51/10 |
| 10,423,226 B2 * | 9/2019 | Chen | ..................... | G06F 3/0346 |

(Continued)

FOREIGN PATENT DOCUMENTS

| | | |
|---|---|---|
| JP | 2019106566 A | 6/2019 |
| WO | 2017043610 A1 | 3/2017 |

OTHER PUBLICATIONS

Okajima (2018) "Crossmodal Effects Induced by Visual Information", Journal of the Institute of Image Information and Television Engineers, Jan. 1, 2018, vol. 72, No. 1, pp. 8-11.

(Continued)

*Primary Examiner* — Toan N Pham

(57) ABSTRACT

When operation information based on motion is input, a pseudo haptic sense presentation device generates a presentation signal for presenting visual information in which a state representing at least any color attribute changes stepwise over time on the basis of visual adjustment information. Here, the visual adjustment information is information for controlling at least one of a change delay amount corresponding to a time from the input of the operation information to start of a change in the state, a change duration amount corresponding to a time from the start to end of the change in the state, or a change rate corresponding to a change amount per unit time of the state.

17 Claims, 9 Drawing Sheets

(56)                    References Cited

U.S. PATENT DOCUMENTS

| | | | |
|---|---|---|---|
| 11,662,822 B1 * | 5/2023 | Huang | ............... G06F 3/04883 |
| | | | 345/173 |
| 2021/0191517 A1 | 6/2021 | Yamano et al. | |

OTHER PUBLICATIONS

Narumi (2018) "Human Interfaces based on Crossmodal Effect", Journal of the Institute of Image Information and Television Engineers, Jan. 1, 2018, vol. 72, No. 1, pp. 2-7.
Samad et al. (2019) "Pseudo-Haptic Weight: Changing the Perceived Weight of Virtual Objects By Manipulating Control-Display Ratio," CHI '19, pp. 1-13, doi =10.1145/3290605.3300550.

\* cited by examiner

PSEUDO HAPTIC SENSE PRESENTATION APPARATUS, PSEUDO HAPTIC SENSE PRESENTATION METHOD, AND PROGRAM

CROSS-REFERENCE TO RELATED APPLICATIONS

This application is a U.S. 371 Application of International Patent Application No. PCT/JP2021/023774, filed on 23 Jun. 2021, the disclosure of which is hereby incorporated herein by reference in its entirety.

TECHNICAL FIELD

The present invention relates to a technology of presenting pseudo haptic sense presentation.

BACKGROUND ART

There has been proposed a method of displaying an avatar of a user's hand or finger on a screen, and increasing or decreasing the magnitude of motion of the avatar for the magnitude of motion of the actual user's hand or finger to give pseudo haptic sense to the user (see, for example, Non Patent Literature 1).

CITATION LIST

Non Patent Literature

Non Patent Literature 1: Samad, Majed and Gatti, Elia and Hermes, Anne and Benko, Hrvoje and Parise, Cesare, "Pseudo-Haptic Weight: Changing the Perceived Weight of Virtual Objects By Manipulating Control-Display Ratio," CHI '19, pp. 1-13, 2019, doi=10.1145/3290605.3300550.

SUMMARY OF INVENTION

Technical Problem

However, the conventional technology is based on the premise that there is spatial correspondence between motion of a user and motion of an avatar, and this imposes limitation on practical use.

The present invention provides a technology that can cause a user to perceive pseudo haptic sense regardless of spatial correspondence between motion of the user and presented visual information.

Solution to Problem

When operation information based on motion is input, a pseudo haptic sense presentation device of the first aspect generates a presentation signal for presenting visual information in which a state representing at least any color attribute changes stepwise over time on the basis of visual adjustment information. Here, the visual adjustment information is information for controlling at least one of a change delay amount corresponding to a time from the input of the operation information to start of a change in the state, a change duration amount corresponding to a time from the start to end of the change in the state, or a change rate corresponding to a change amount per unit time of the state.

When motion information for operating a motion device is output, a pseudo haptic sense presentation device of the second aspect generates a presentation signal for presenting visual information in which a state representing at least any color attribute changes stepwise over time on the basis of visual adjustment information. Here, the visual adjustment information is information for controlling a visual adjustment parameter that is at least one of a change delay amount corresponding to a time from the output of the motion information to start of a change in the state, a change duration amount corresponding to a time from the start to end of the change in the state, or a change rate corresponding to a change amount per unit time of the state.

Advantageous Effects of Invention

As a result, a user can be caused to perceive pseudo haptic sense regardless of spatial correspondence between motion of the user and presented visual information.

DESCRIPTION OF EMBODIMENTS

Hereinafter, embodiments of the present invention will be described with reference to the drawings.

Principles

The inventor conducted the following experiment and discovered a natural law (physiological law) as a premise.

Experimental Procedure

Figure 2:
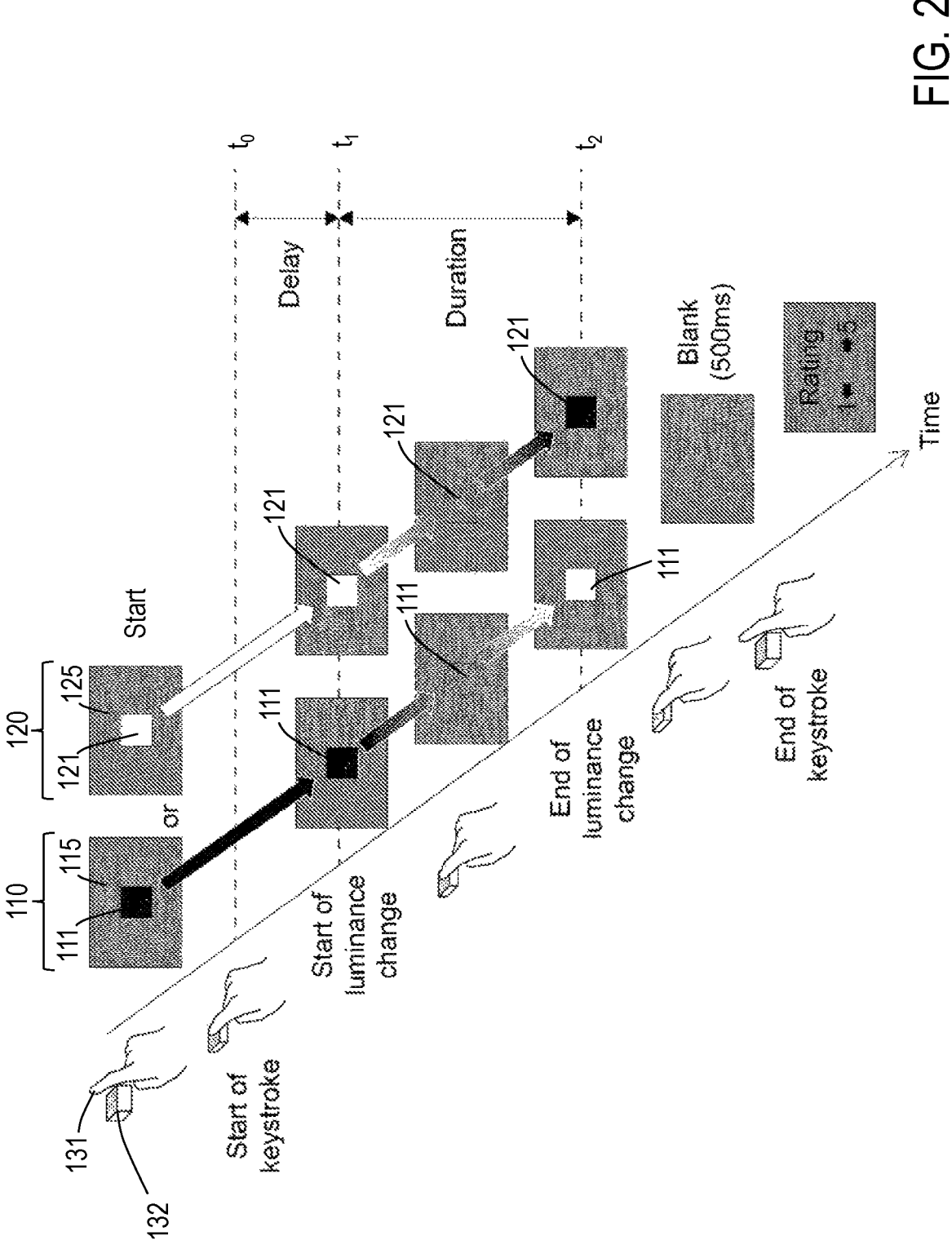
FIG. 2 is a diagram for illustrating a flow of an experiment as a premise of the embodiment.

As illustrated in FIG. 2, an image 110 in which a black square 111 is drawn on a gray background 115 or an image 120 in which a white square 121 is drawn on a gray background 125 is displayed on a display device (Start). A subject presses down a key 132 using a finger 131 while viewing the displayed image 110 or 120. After a certain time (Delay) elapses after the key 132 is pressed down, the luminance of the square 111 or 121 displayed on the display device is changed stepwise with the lapse of a time over certain time (Duration). That is, after a certain time (for example, Delay of any of 0, 250, 500, 750, and 1000 [ms]) elapses after the key 132 is pressed (Start of keystroke), the luminance change of the square 111 or 121 is started (Start of luminance change), and the square 111 is changed stepwise from black to white or the color of the square 121 is changed stepwise from white to black over certain time (Duration of any of 500, 1000, and 2000 [ms]). When the luminance change of the square 111 or 121 ends (End of luminance change), the square 111 or 121 disappears, and the subject ends the pressing down of the key 132 (End of keystroke). After the lapse of a certain period of a time (for example, 500 [ms]) from the end of the luminance change of the square 111 or 121, the subject was caused to rate, on a scale of 1 to 5, "weight feeling (resistance feeling)", "stiffness feeling", and "ruggedness feeling" felt while pressing the key, and to input rating scores of 1 to 5. The rating in each experimental condition (combination of five Delays and three Durations) was repeated five times in a random order, and each subject performed a total of 75 trials.

Experiment Result

Figure 3:
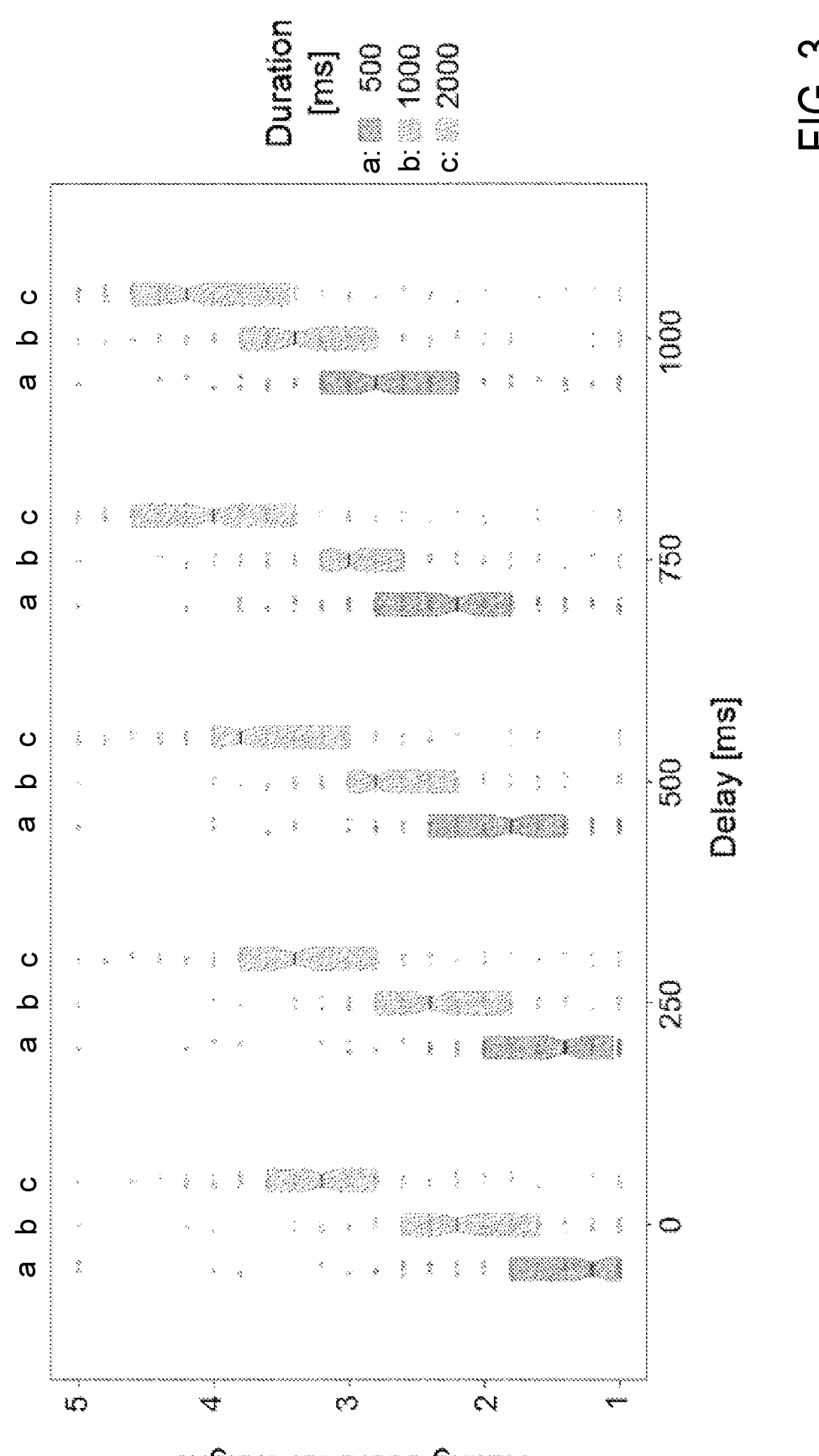
FIG. 3 is a diagram for illustrating an experiment result as a premise of the embodiment.

FIG. 3 illustrates an example of an experiment result regarding weight feeling for all subjects. In FIG. 3, the horizontal axis represents a Delay [ms], and the vertical axis represents a rating score of the weight feeling (rating score on a scale of 1 to 5). The larger the rating score, the larger the weight feeling. Durations of 500, 1000, and 2000 [ms] are represented by a, b, and c, respectively. In FIG. 3, rating scores under respective experimental conditions are averaged for each of the subjects and plotted. As illustrated in FIG. 3, a Delay and a Duration have significant influence on the weight feeling, and the perceived weight feeling increases as the Delay increases and as the Duration is longer (as the change is slower).

Figure 4:
FIG. 4 is a diagram for illustrating an experiment result as a premise of the embodiment.

FIG. 4 illustrates an example of an experimental result regarding stiffness feeling. In FIG. 4, the horizontal axis represents a Delay [ms], and the vertical axis represents a rating score of the stiffness feeling (rating score on a scale of 1 to 5). The larger the rating score, the larger the stiffness feeling. Durations of 500, 1000, and 2000 [ms] are represented by a, b, and c, respectively. Also in FIG. 4, rating scores under respective experimental conditions are averaged for each of the subjects and plotted. As illustrated in FIG. 4, a Delay and a Duration have significant influence on the stiffness feeling, and the perceived stiffness feeling increases as the Delay increases and as the Duration is longer (as the change is slower).

Similarly in ruggedness feeling, it has been found that a Delay and a Duration have significant influence on ruggedness feeling, although the experimental result is omitted.

As described above, in spite of a non-intuitive situation in which the luminance of the square 111 or 121 is changed according to motion of a finger (operation of pressing a key) without the motion of the finger being spatially reproduced, pseudo haptic sense such as weight feeling, stiffness feeling, and ruggedness feeling can be changed only by temporal factors including a Delay and a Duration being operated. As described above, it can be seen that a subject can caused to perceive pseudo haptic sense only by the temporal factors of presented visual information being operated regardless of spatial correspondence between the presented visual information and motion of the subject. Such a natural law (physiological law) has not been known so far. In this experiment, when a key was pressed using a finger, the luminance of a square in an image was changed stepwise over time. However, this natural law is generally established in a case where a state representing at least any color attribute of visual information being presented to a subject is changed stepwise over time when an operation based on motion of a body part of the subject is performed. The "visual information" means information indicating a color attribute. The "color attribute" means at least one of three attributes of color. The three attributes of color may be "hue", "saturation", and "luminance" in the HSL color space, or may be "hue", "saturation", and "value" in the HSV color space. That is, for example, the color attribute is an attribute representing color or luminance. Furthermore, in this experiment, the temporal factors including a Delay and a Duration were operated. However, this natural law is generally established in a case where a change delay amount corresponding to a time from when the operation is performed to when a change of the state is started, or a change duration amount corresponding to a time from when the change of the state is started to when the change is ended is operated. Further, the change duration amount also has close relationship with a change rate corresponding to a change amount per unit time of the state. Therefore, this natural law is also established in a case where the change rate is operated. Furthermore, such a natural law is established also in a case where a state representing at least any color attribute of visual information being presented to a subject is changed stepwise over time when an operation based on motion of a body part of a person other than the subject or an animal is performed and the subject was looking at the state. Further, such a natural law is established also in a case where a state representing at least any color attribute of visual information being presented to a subject is changed stepwise over time when an operation based on motion of a motion device such as a robot that is not the subject is performed and the subject was looking at the state. In the latter case, such a natural law is established also in a case of using output of motion information for operating the operation device as a trigger instead of using an operation based on motion of the motion device as a trigger. However, the change delay amount in this case corresponds to a time from the output of the motion information to start of a change in the state representing the color attribute. In such a case, a subject perceives indirect pseudo haptic sense such as "appears to be heavy" or "appears to be stiff". Here, such pseudo haptic sense can be changed by at least one of the change delay amount, the change duration amount, or the change rate being controlled.

<Use of Natural Law>

In each of the embodiments, when operation information based on motion of a body part is input, a pseudo haptic sense presentation device generates and outputs a presentation signal for presenting visual information in which a state representing at least any color attribute changes stepwise over time on the basis of visual adjustment information. However, the visual adjustment information is for controlling at least one of a change delay amount corresponding to a time from the input of the operation information to start of a change in the state, a change duration amount corresponding to a time from the start to end of the change in the state, or a change rate corresponding to a change amount per unit time of the state. This is based on the above-described newly discovered natural law, and is information that is not used for presenting pseudo haptic sense without such a discovery. By visual information based on such a presentation signal being presented to a user, the user can be caused to perceive pseudo haptic sense regardless of spatial correspondence between the visual information and motion of the user. Hereinafter, each of the embodiments will be described.

First Embodiment

First, a first embodiment of the present invention will be described.

Configuration

Figure 1:
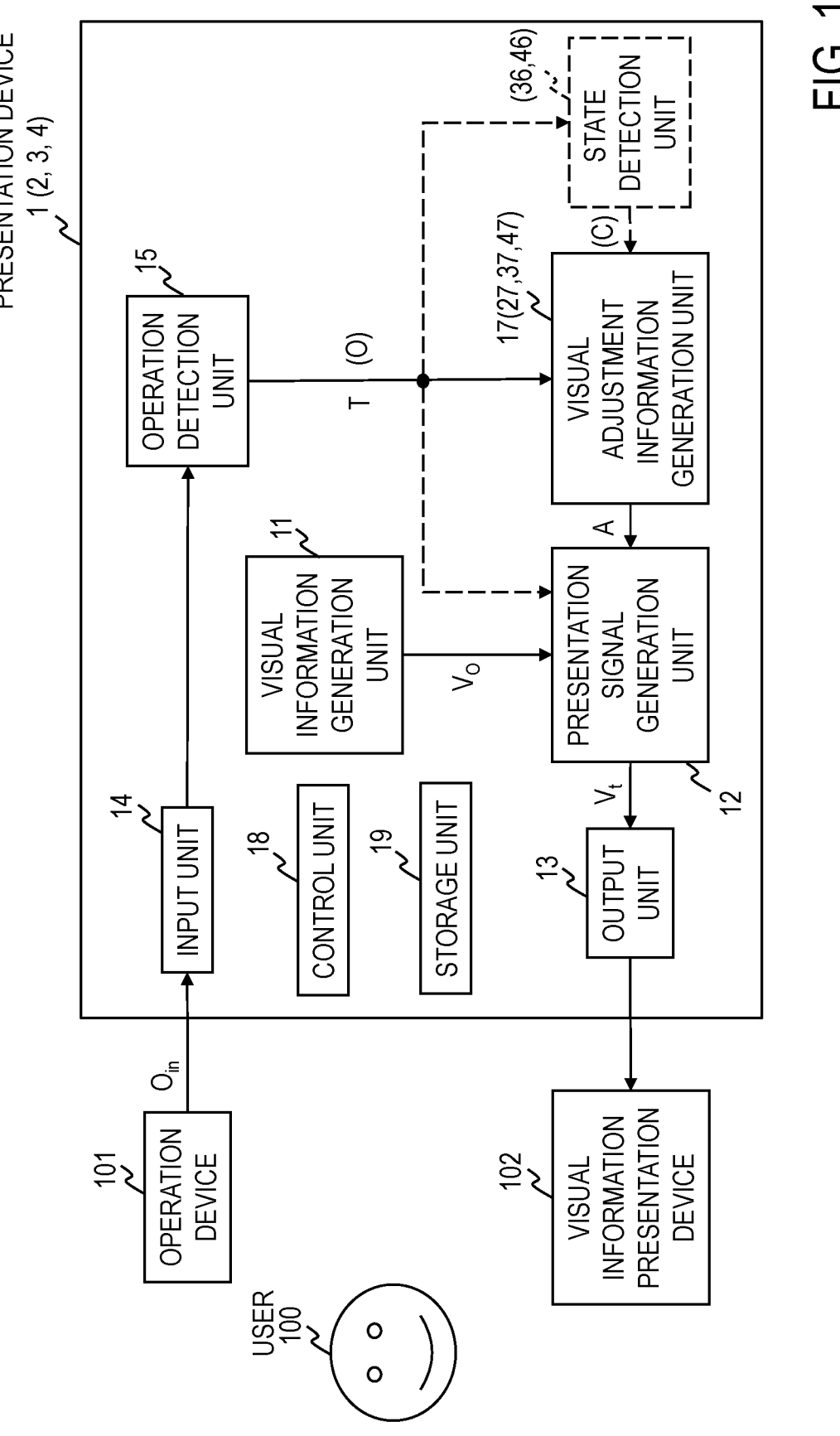
FIG. 1 is a block diagram for describing a functional configuration of a pseudo haptic sense presentation device according to an embodiment.

As illustrated in FIG. 1, the pseudo haptic sense presentation device 1 of the present embodiment includes a visual information generation unit 11, a presentation signal generation unit 12, an output unit 13, an input unit 14, an operation detection unit 15, a visual adjustment information generation unit 17, a control unit 18, and a storage unit 19, and performs each type of processing on the basis of control of the control unit 18. Input information to the pseudo haptic sense presentation device 1 and information obtained by each unit are stored in the storage unit 19, and read and used as necessary. A hardware configuration of the pseudo haptic sense presentation device 1 will be described below.

An operation device 101 is connected to the input unit 14 of the pseudo haptic sense presentation device 1 in a wired or wireless manner. The operation device 101 is a device that detects an operation based on motion of a body part of a user 100. For example, a device that detects an operation performed in a state where a body part of the user 100 is in contact with an object can be used as the operation device 101. In the present embodiment, in order to simplify the description, a case where the operation device 101 is a physical key (for example, key of a keyboard) that is pressed by a finger of the user 100 will be described as an example. However, this is merely an example, and any device may be used as the operation device 101 as long as the device detects an operation based on motion of a body part (for example, hand, finger, foot, head, face, eye, or the like) of the user 100.

Furthermore, a visual information presentation device 102 is connected to the output unit 13 of the pseudo haptic sense presentation device 1 in a wired or wireless manner. The visual information presentation device 102 is a device that presents visual information indicating a color attribute. The "visual information" may be any information indicating a color attribute. In the present embodiment, in order to simplify the description, a case where the visual information is an image and the visual information presentation device 102 is a display (for example, liquid crystal display) that displays (presents) the image will be described as an example. However, this is merely an example, and any device may be used as the visual information presentation device 102 as long as the device presents the visual information indicating a color attribute.

Processing

Next, processing of the first embodiment will be described with reference to FIGS. 1, 2, 5, 6A, and 6B. The visual information generation unit 11 of the pseudo haptic sense presentation device 1 generates information $V_0$ indicating initial visual information. As described above, the "visual information" is information indicating a color attribute. A state representing the color attribute of the initial visual information may be any state. Here, the "state representing the color attribute" may be a state of the color attribute itself (for example, hue, saturation, or luminance or value), or may be a state for causing perception of an apparent color attribute. For example, an image having pixels having different color attributes themselves of the luminance or the like has understandably different perceived color attributes. Furthermore, for example, even if an image has pixels having the same color attribute, the perceived apparent color attribute is different if the number of pixels displayed per unit area, that is, the density of the displayed pixels is different. As described above, the "state representing the color attribute" means a state corresponding to a color attribute finally perceived. In the present embodiment, a case where the visual information is a quadrangular image will be described as an example. The information $V_0$ indicating the initial visual information is transmitted to the presentation signal generation unit 12 (step S11).

The presentation signal generation unit 12 generates and outputs a presentation signal $V_t$ for presenting the visual information in which the state indicating the color attribute is a first state using the input information $V_0$ indicating the initial visual information. The presentation signal $V_t$ is information for presenting visual information at each time t. The "first state" may be a state representing a color attribute of the initial visual information, or may be a state representing other color attributes. The "first state" may be a fixed specific state (predetermined specific state that does not change for each operation) or may be a changeable state (for example, state that can change for each operation on the basis of input information, a random number, or the like). However, fixing the first state to a specific state makes a difference in pseudo haptic sense according to the visual adjustment information clear. In the present embodiment, in order to simplify the description, a case where the visual information in the first state is an image of the black square 111 (for example, image at the time point of "Start" in FIGS. 2 and 6A) and a case where the visual information in the first state is an image of the white square 121 (for example, image at the time point of "Start" in FIGS. 2 and 6B) will be exemplified. However, these do not limit the present invention, and a state representing other color attributes may be set as the first state.

The presentation signal $V_t$ for presenting the visual information in the first state is transmitted to the visual information presentation device 102. The visual information presentation device 102 presents the visual information in the first state at each time t in accordance with the presentation signal $V_t$. For example, in a case where the visual information in the first state is the image of the black square 111, the visual information presentation device 102 displays the image (for example, image at the time point of "Start" in FIGS. 2 and 6A). For example, in a case where the visual information in the first state is the image of the white square 121, the visual information presentation device 102 presents the image (for example, image at the time point of "Start" in FIGS. 2 and 6B) (step S121).

The user 100 performs an operation (operation based on motion of a body part) on the operation device 101 at any timing while viewing the image (visual information) displayed on the visual information presentation device 102. As described above, the operation device 101 exemplified in the present embodiment is a physical key, and the user 100 can perform an operation (pressing operation in the example of the present embodiment) on the operation device 101 using a finger. When the operation is performed on the operation device 101, the operation device 101 outputs operation information $O_{in}$ indicating that the operation has been performed (operation information based on motion of a body part). The operation information $O_{in}$ output from the operation device 101 is input to the input unit 14 of the pseudo haptic sense presentation device 1 and transmitted to the operation detection unit 15. The operation detection unit 15 monitors whether the operation information $O_{in}$ has been input. In a case of determining that the operation information $O_{in}$ has not been input, the control unit 18 returns the processing to step S121. On the other hand, in a case of determining that the operation information $O_{in}$ has been input, the operation detection unit 15 transmits a trigger signal T indicating that the operation information $O_{in}$ has been input to the visual adjustment information generation unit 17 (step S15).

The visual adjustment information generation unit 17 to which the trigger signal T is input generates visual adjustment information A for changing the state representing the color attribute of the visual information being presented stepwise from the first state to a second state over time. The second state is a state obtained by changing a state representing at least any color attribute of the first state stepwise. For example, a state obtained by changing at least any color attribute itself (for example, at least part of hue, saturation, or luminance or value) of the initial visual information in the first state stepwise may be the second state, or a state obtained by changing a state representing an apparent color attribute (for example, density of displayed pixels) of the initial visual information in the first state stepwise may be the second state. The first state may be different from the second state, or may be the same state as the second state. That is, the second state different from the first state may be reached, or the second state same as the original first state may be reached by the state representing at least any color attribute of the first state being changed stepwise. Similarly to the first state, the second state may be a fixed state (predetermined specific state that does not change for each operation) or may be a changeable state (for example, state that can change for each operation on the basis of input information, a random number, or the like). However, fixing the second state to a specific state (predetermined specific state) makes a difference in pseudo haptic sense according to the visual adjustment information A clear. In particular, fixing both the first state and the second state to respective specific states (fixing both the first state and the second state to respective specific states in each operation) makes a difference in pseudo haptic sense according to the visual adjustment information A clearer.

The visual adjustment information A is based on the natural law that has not been known so far, and is information for controlling a "visual adjustment parameter" that is at least one of (1) a change delay amount corresponding to a time from input of the operation information $O_{in}$ to start of a change in a state representing a color attribute of visual information, (2) a change duration amount corresponding to a time from the start to end (stop) of the change in the state representing the color attribute of the visual information, or (3) a change rate corresponding to a change amount per unit time of the state representing the color attribute of the visual information.

Specific examples of (1) the change delay amount are as follows.

A time De1 from when operation information $O_{in}$ is input to any one of the input unit 14, the operation detection unit 15, and the visual adjustment information generation unit 17 to when a change in a state representing a color attribute of presented visual information (stepwise change from the first state to the second state) is started.

A time De2 from when an operation is performed on the operation device 101 to when a change in a state representing a color attribute of presented visual information is started.

Information by which the time De1 or De2 can be identified.

For example, any time De1 or De2 in 0-1000 [ms] or information by which the time De1 or De2 can be identified may be used as the change delay amount, although the magnitude of the change delay amount is not limited thereto.

Specific examples of (2) the change duration amount are as follows.

A time Du1 until a state representing a color attribute of presented visual information changes stepwise from the first state to the second state.

Information by which the time Du1 can be identified.

Note that a state representing the same color attribute may change stepwise from the first state to the second state (for example, the luminance continuously changes stepwise over time), a state representing a plurality of color attributes may change stepwise at the same time (for example, the hue and the luminance continuously change stepwise at the same time over time), or a state representing different color attributes may sequentially change over time (for example, the luminance changes stepwise over time in the first half, and the hue changes stepwise over time in the latter half). For example, any time Du1 in 0.5-2 [s] or information by which the time Du1 can be identified may be used as the change duration amount, although the magnitude of the change duration amount is not limited thereto.

Specific examples of (3) the change rate are as follows.

A change amount Cr1 per unit time of a state representing a color attribute of presented visual information during a period from the first state to the second state.

A change amount Cr2 per unit time of a state representing a color attribute of presented visual information during a period from when operation information $O_{in}$ is input to any one of the input unit 14, the operation detection unit 15, and the visual adjustment information generation unit 17 to when a state representing a color attribute of visual information reaches the second state.

A change amount Cr3 per unit time of a state representing a color attribute of presented visual information during a period from when an operation is performed on the operation device 101 to when a state representing a color attribute of visual information reaches the second state.

Information by which any one of change amounts Cr1, Cr2, and Cr3 per unit time can be identified.

Note that the change amount per unit time of a state representing a color attribute of visual information may be, for example, a change amount per unit time of a single color attribute (for example, luminance), a change amount per unit time of each of a plurality of color attributes (for example, hue and luminance), or a change amount per unit time of a state representing an apparent color attribute (for example, density of displayed pixels). The change amount per unit time of a state representing a color attribute of visual information may be constant from the first state to the second state, or may not be constant (may change according to the lapse of a time). For example, the change amount Cr1, Cr2, or Cr3 per unit time when a change ends in 0.5-2 [s] from the first state to the second state or information by which the change amount Cr1, Cr2, or Cr3 per unit time can be identified may be used as the change rate, although the magnitude of the change rate is not limited thereto.

The visual adjustment information A is information that enables the presentation signal generation unit 12 to uniquely identify at least one (visual adjustment parameter) of (1) the change delay amount, (2) the change duration amount, and (3) the change rate. As long as the visual adjustment information A is such information, any information may be used as the visual adjustment information A. For example, focusing on (1) the change delay amount, if the presentation signal generation unit 12 does not use a predetermined constant value as the change delay amount, the visual adjustment information A may include at least the change delay amount. For example, focusing on (2) the change duration amount or (3) the change rate, if the first state and the second state are predetermined, the visual adjustment information A may include at least either the change duration amount or the change rate. For example, if the change duration amount or the change rate is predetermined, the visual adjustment information A may include at least information regarding the first state and the second state. In addition, in any case, the visual adjustment information A may include information indicating the state representing which color attribute changes over time stepwise, or may include information indicating how the state representing a color attribute changes over time stepwise. The visual adjustment information generation unit 17 transmits the visual adjustment information A to the presentation signal generation unit 12 (step S172).

The presentation signal generation unit 12 to which the visual adjustment information A is input generates a presentation signal $V_t$ for presenting (displaying) visual information in which the state representing at least any color attribute changes stepwise over time (visual information that changes stepwise over time from the first state to the second state) using the input visual adjustment information A and the information $V_0$ indicating the initial visual information. For example, the presentation signal generation unit 12 generates the presentation signal $V_t$ for presenting visual information in which the state representing the color attribute of the initial visual information represented by the information $V_0$ changes stepwise over time from the first state to the second state on the basis of the visual adjustment information A. The visual adjustment parameter that is at least one of the change delay amount, the change duration amount, or the change rate of the visual information is uniquely determined on the basis of the visual adjustment information A. A visual adjustment parameter that is not determined on the basis of the visual adjustment information A may be determined in advance, may be determined on the basis of input, or may be determined randomly. The presentation signal $V_t$ is transmitted to the visual information presentation device 102, and the visual information presentation device 102 presents the visual information at each time t according to the presentation signal $V_t$.

Figures 6A, 6B:
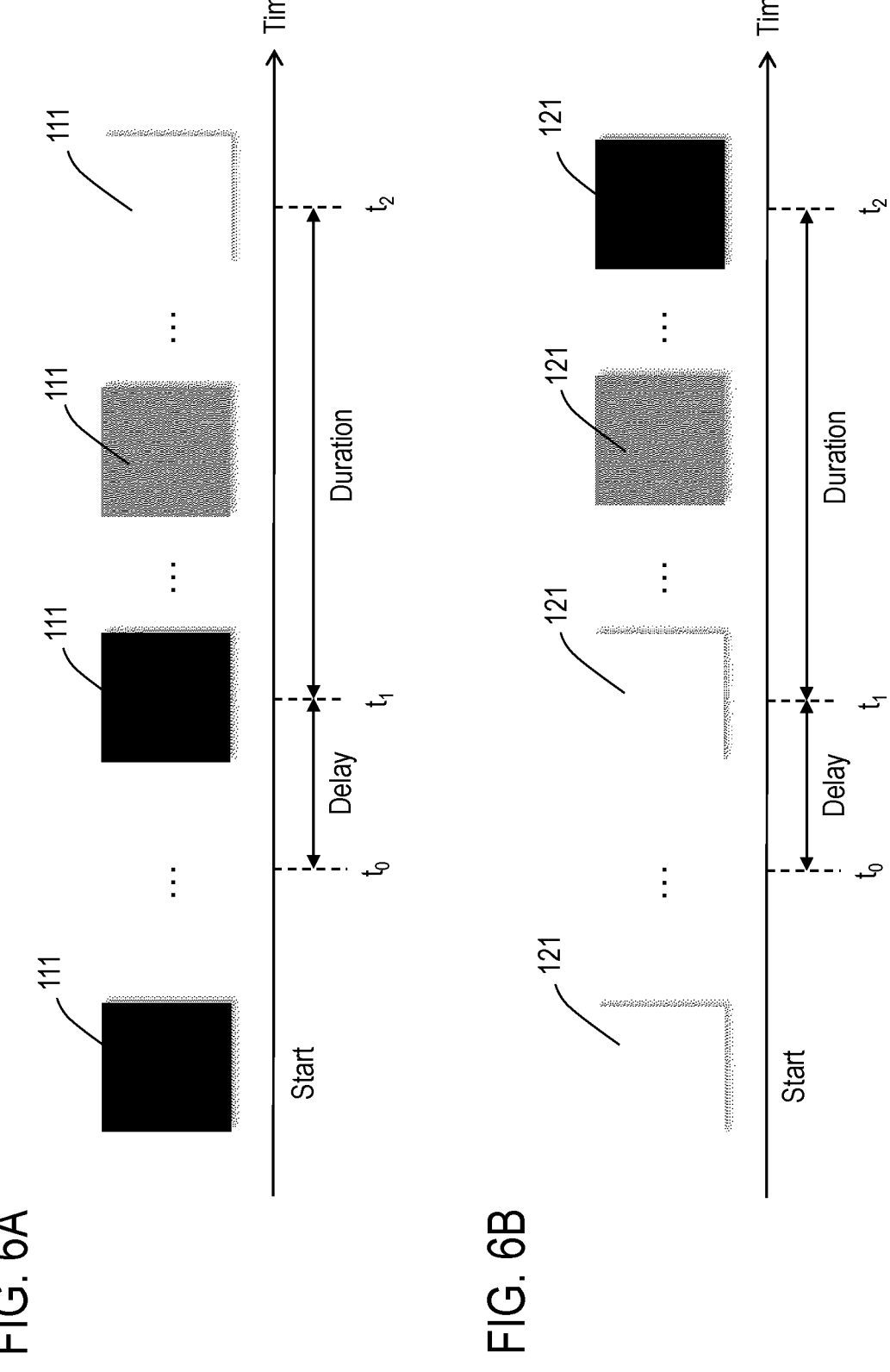
FIGS. 6A and 6B are diagrams for illustrating presented visual information.

For example, in a case where the visual information in first state is the image of the black square 111, the following visual information is presented (FIGS. 2 and 6A).

(i) The image of the black square 111 (visual information in the first state) is presented during a period from a time point $t_0$ (time point at which the operation information $O_{in}$ is input to any of the input unit 14, the operation detection unit 15, and the visual adjustment information generation unit 17, or time point at which an operation is performed on the operation device 101) to a time point $t_1$ (time point at which a time corresponding to the change delay amount (Delay) has elapsed from the time point $t_0$).

(ii) The luminance of the image of the square 111 changes stepwise from black (first state) to white (second state) over time during a period from the time point $t_1$ to a time point $t_2$ (time point when a time corresponding to the change duration amount (Duration) has elapsed). When reaching the time point $t_2$, the change in the luminance stops.

For example, in a case where the visual information in the first state is the image of the white square 121, the following visual information is presented (FIGS. 2 and 6B).

(i) The image of the white square 121 (visual information in the first state) is presented during the period from the time point $t_0$ (time point at which the operation information $O_{in}$ is input to any of the input unit 14, the operation detection unit 15, and the visual adjustment information generation unit 17, or time point at which an operation is performed on the operation device 101) to the time point $t_1$ (time point at which a time corresponding to the change delay amount (Delay) has elapsed from the time point $t_0$).

(ii) The luminance of the image of the square 121 changes stepwise from white (first state) to black (second state) over time during the period from the time point $t_1$ to the time point $t_2$ (time point when a time corresponding to the change duration amount (Duration) has elapsed). When reaching the time point $t_2$, the change in the luminance stops.

Furthermore, for example, in a case where the visual information in the first state is the image of the black square 111, the following visual information may be presented.

(i) The image of the black square 111 (visual information in the first state) is presented during the period from the time point $t_0$ to the time point $t_1$ (time point at which time corresponding to the change delay amount (Delay) has elapsed from the time point $t_0$).

(ii) The luminance of the image of the square 111 changes stepwise from black (first state) to white and further changes stepwise from white to black (second state) over time during the period from the time point $t_1$ to the time point $t_2$ (time point when a time corresponding to the change duration amount (Duration) has elapsed). When reaching the time point $t_2$, the change in the luminance stops (step S122).

Features of First Embodiment

In the present embodiment, when operation information based on motion of a body part of a user 100 is input to the pseudo haptic sense presentation device 1, the pseudo haptic sense presentation device 1 generates and outputs a presentation signal for presenting visual information in which a state representing at least any color attribute changes stepwise over time on the basis of visual adjustment information, and presents the visual information to the user 100 from the visual information presentation device 102. Here, the visual adjustment information is information for controlling a visual adjustment parameter that is at least one of a change delay amount corresponding to a time from the input of the operation information to start of a change in the state, a change duration amount corresponding to a time from the start to end of the change in the state, or a change rate corresponding to a change amount per unit time of the state. As a result, the body part (for example, body part such as a finger by which the operation is performed) of the user 100 (human) can be caused to perceive pseudo haptic sense such as weight feeling, stiffness feeling, and ruggedness feeling regardless of spatial correspondence between motion of the user 100 and the presented visual information. These principles are based on the finding of the aforementioned natural law. As described above, the magnitude of such pseudo haptic sense varies depending on the change delay amount, the change duration amount, and the change rate. Therefore, the magnitude of pseudo haptic sense (for example, magnitude of weight feeling, magnitude of stiffness feeling, and magnitude of ruggedness feeling) can be changed by the visual adjustment parameter being controlled.

In the conventional art described in Non Patent Literature 1, measuring spatiotemporal speed/acceleration information of motion of a hand or a finger using a computer mouse, a pen tablet, a motion sensor, or the like, and drawing an avatar having spatiotemporal correspondence with the motion of the hand or the finger on a screen are necessary in order to cause perception of pseudo haptic sense. Therefore, in an environment where only ON/OFF information can be input such as a key or a button, speed/acceleration information corresponding to the motion of the hand or the finger cannot be obtained, and perception of pseudo haptic sense cannot be caused. On the other hand, in the method of the present embodiment, perception of pseudo haptic sense can be caused only by temporal correspondence such as a change delay amount, a change duration amount, and a change rate without using spatial correspondence. Therefore, perception of pseudo haptic sense can be caused in an environment in which an operation based on at least some motion of a body part (for example, operation indicating an ON/OFF intention) can be performed.

Furthermore, an avatar of a user's hand or finger needs to be displayed on a screen having a certain size and resolution in the conventional art, and thus perception of pseudo haptic sense cannot be caused in an environment where such an image cannot be displayed. On the other hand, in the method of the present embodiment, perception of pseudo haptic sense can be caused if there is an environment in which visual information in which a state representing any color attribute changes stepwise over time can be presented (for example, environment in which an image can be displayed on a small screen such as a smart watch, or environment in which one LED light source can be lit at any brightness).

The method of the present embodiment does not require visual acceleration information in the sense of a spring-mass-damper system, and perception of pseudo haptic sense can be caused even if a state representing a color attribute of visual information changes at a constant rate. Furthermore, in the method of the present embodiment, perception of pseudo haptic sense can be caused only by temporal correspondence such as a change delay amount, a change duration amount, and a change rate even if there is no spatial correspondence between presented visual information and a body part or an operation device. Furthermore, by using the method of the present embodiment, a psychological effect, that is, pseudo haptic sense can be generated even if the color attribute (for example, color or luminance) itself of presented visual information does not cause intuition of an operation or an operation state. Therefore, perception of pseudo haptic sense can be caused even in a case where the pseudo haptic sense presentation device 1 does not have large calculation capability.

Furthermore, as described above, fixing at least one of the first state and the second state to a specific state makes a difference in pseudo haptic sense according to visual adjustment information clear regardless of the visual adjustment information. Therefore, at least one of the first state and the second state is desirably fixed to a specific state. In particular, fixing both of the first state and the second state to respective specific states makes a difference in pseudo haptic sense according to visual adjustment information clearer. Therefore, both of the first state and the second state are desirably fixed to respective specific states.

Furthermore, perception of pseudo haptic sense is more clearly caused in a case where an operation is performed in a state where a body part is in contact with an object. Therefore, the operation device 101 is desirably a device that receives an operation performed in a state where a body part is in contact with an object and outputs operation information based on the operation.

Modification 1 of First Embodiment

In the first embodiment, after operation information is input to the pseudo haptic sense presentation device, visual adjustment information is generated (step S172), and a presentation signal for presenting visual information that changes stepwise from the first state to the second state is generated and output (step S122). However, this does not limit the present invention, and the present invention may be implemented in other processing order. For example, visual adjustment information may be generated and a presentation signal for presenting visual information that changes stepwise from the first state to the second state may be generated before operation information is input to the pseudo haptic sense presentation device. Such a modification will be described below. Hereinafter, differences from the matters described so far will be mainly described, and the description of common parts will be simplified using the same reference signs.

Configuration

This is the same as the first embodiment.

Processing

Figure 7:
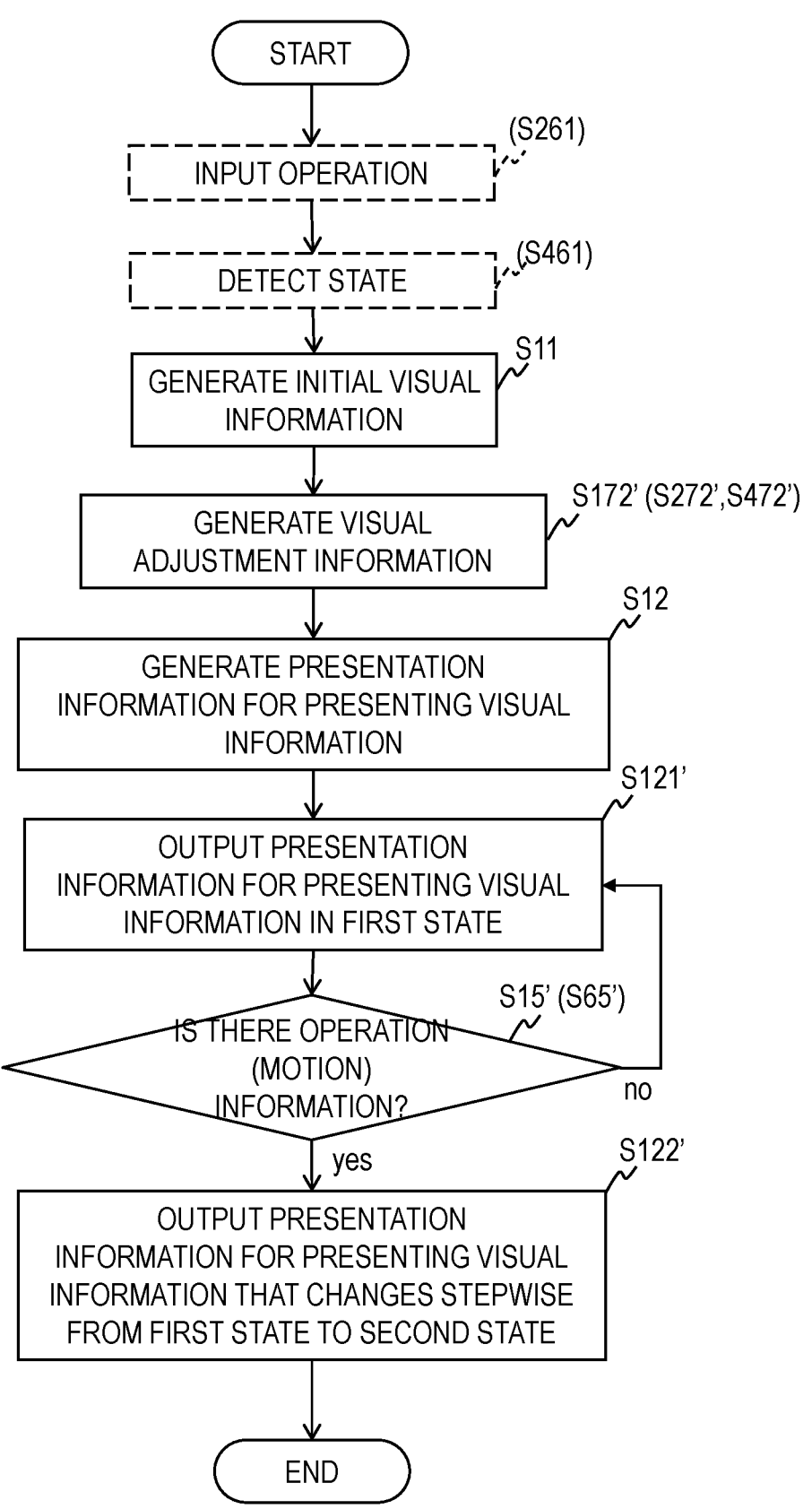
FIG. 7 is a flowchart for describing processing of the embodiment.

Processing of the present modification will be described with reference to FIG. 7. The visual information generation unit 11 of the pseudo haptic sense presentation device 1 generates information $V_0$ indicating initial visual information. The information $V_0$ indicating the initial visual information is transmitted to the presentation signal generation unit 12 (step S11).

The visual adjustment information generation unit 17 generates visual adjustment information A for changing a state representing a color attribute of visual information being presented stepwise from the first state to the second state over time. The visual adjustment information generation unit 17 transmits the visual adjustment information A to the presentation signal generation unit 12 (step S172').

The presentation signal generation unit 12 generates a presentation signal $V_t$ for presenting visual information in which the state representing the color attribute is the first state and a presentation signal $V_t$ for presenting visual information in which the state representing at least any color attribute changes stepwise over time (visual information that changes stepwise over time from the first state to the second state) using the input information $V_0$ indicating the initial visual information and the visual adjustment information A (step S12).

The presentation signal $V_t$ for presenting the visual information in the first state is transmitted to the visual information presentation device 102. The visual information presentation device 102 presents the visual information in the first state at each time t in accordance with the presentation signal $V_t$ (step S121').

The user 100 performs an operation (operation based on motion of a body part) on the operation device 101 at any timing while viewing the image (visual information) displayed on the visual information presentation device 102. When the operation is performed on the operation device 101, the operation device 101 outputs operation information $O_{in}$ indicating that the operation has been performed (operation information based on motion of a body part). The operation information $O_{in}$ output from the operation device 101 is input to the input unit 14 of the pseudo haptic sense presentation device 1 and further transmitted to the operation detection unit 15. The operation detection unit 15 monitors whether the operation information $O_{in}$ has been input. In a case where the operation information $O_{in}$ has not been input, the control unit 18 returns the processing to step S121'. On the other hand, in a case where the operation information $O_{in}$ has been input, the operation detection unit 15 transmits a trigger signal T indicating that the operation information $O_{in}$ has been input to the presentation signal generation unit 12 (step S15').

The presentation signal generation unit 12 to which the trigger signal T is input transmits the presentation signal $V_t$ for presenting visual information in which the state representing at least any color attribute changes stepwise over time (visual information that changes stepwise over time from the first state to the second state) to the visual information presentation device 102. The visual information presentation device 102 presents the visual information at each time t in accordance with the presentation signal $V_t$ (step S122').

Features of Modification 1 of First Embodiment

Even in this case, an effect similar to that of the first embodiment can be obtained.

Second Embodiment

The present embodiment is a modification of the first embodiment, and is different from the first embodiment in that visual information is generated using visual adjustment information based on operation content.

Configuration

As illustrated in FIG. 1, a pseudo haptic sense presentation device 2 of the present embodiment includes a visual information generation unit 11, a presentation signal generation unit 12, an output unit 13, an input unit 14, an operation detection unit 15, a visual adjustment information generation unit 27, a control unit 18, and a storage unit 19, and performs each type of processing on the basis of control of the control unit 18. A hardware configuration of the pseudo haptic sense presentation device 2 will be described below. An operation device 101 is connected to the input unit 14 of the pseudo haptic sense presentation device 2 in a wired or wireless manner. A visual information presentation device 102 is connected to the output unit 13 of the pseudo haptic sense presentation device 2 in a wired or wireless manner. As described above, the operation device 101 and the visual information presentation device 102 may be of any device.

Processing

In the present embodiment, as preprocessing, association information in which a plurality of types of operation content and visual adjustment information corresponding to each of the types of operation content are associated with each other (for example, the association information is a table) is stored in the storage unit 19. The operation content stored in the association information may be operation content based on motion of a body part performed on the operation device 101, or may be operation content based on motion of a body part performed on an operation device (second operation device) (not illustrated) other than the operation device 101. In the present embodiment, an example in which operation content based on motion of a body part performed on the operation device 101 is stored in the storage unit 19 will be described in order to simplify the description. However, this does not limit the present invention.

The plurality of types of operation content stored in the storage unit 19 may be any content. For example, a plurality of types of operation content having different lengths of operation times and/or different numbers of operations for the operation device 101 may be stored in the storage unit 19. For example, in a case where the operation device 101 is a physical key, operation content such as "a press down operation performed only once for a short time", "a press down operation performed twice consecutively for a short time", and "a press down operation performed for a long time" are stored. However, this does not limit the present invention.

The visual adjustment information associated with each of the plurality of types of operation content may be any visual adjustment information. However, the visual adjustment information associated with each of the plurality of types of operation content is not all the same, and at least any pieces of the visual adjustment information are different from each other.

For example, different values of the same visual adjustment parameter (for example, change delay amount) may be associated with different types of operation content. For example, for the same visual adjustment parameter (for example, change delay amount), a value of the visual adjustment parameter identified by visual adjustment information associated with a certain type of operation content (first operation content) may be different from a value of the visual adjustment parameter identified by visual adjustment information associated with another type of operation content (second operation content different from the first operation content).

Furthermore, for example, different visual adjustment parameters (for example, change delay amount and change duration amount) may be associated with different types of operation content. For example, a visual adjustment parameter identified by visual adjustment information associated with a certain type of operation content (first operation content) (for example, the parameter is a change delay amount) may be different from a visual adjustment parameter identified by visual adjustment information associated with another type of operation content (second operation content different from the first operation content) (for example, the parameter is a change duration amount).

Furthermore, there may be a correlation between operation content and pseudo haptic sense presented by visual information based on visual adjustment information associated with the operation content. For example, visual adjustment information corresponding to pseudo haptic sense in which at least one of weight feeling, stiffness feeling, or ruggedness feeling is larger may be associated as the operation time of the operation content for the operation device 101 is longer. For example, visual adjustment information in which the change delay amount and/or the change duration amount is larger or visual adjustment information in which the change rate is smaller may be associated as the operation time of the operation content for the operation device 101 is longer. Furthermore, in a case where a plurality of types of operation content having different numbers of operations is stored in the storage unit 19, visual adjustment information corresponding to pseudo haptic sense in which at least one of weight feeling, stiffness feeling, or ruggedness feeling is larger may be associated as the number of operations on the operation device 101 is larger. For example, visual adjustment information in which the change delay amount and/or the change duration amount is larger or visual adjustment information in which the change rate is smaller may be associated as the number of operations on the operation device 101 is larger.

When an operation based on motion of a body part is performed on the operation device 101, operation information O indicating the operation content is output from the operation device 101. Among such operation information O, only operation information indicating specific operation content (for example, press down operation performed for a long time) is treated as the above-described operation information $O_{in}$ (operation information based on motion of a body part). The specific operation content may be any of the plurality of types of operation content stored in the association information of the storage unit 19, or may be other operation content.

On the basis of the above premise, processing of the second embodiment will be described with reference to FIGS. 1 and 7.

When a user 100 performs an operation on the operation device 101 using the body part, operation information O indicating the operation content is transmitted to the input unit 14 and further transmitted to the operation detection unit 15. The operation detection unit 15 transmits the input operation information O to the visual adjustment information generation unit 27 (step S261).

Thereafter, the visual information generation unit 11 performs processing of step S11 described in the first embodiment.

The operation information O is input to the visual adjustment information generation unit 27. The visual adjustment information generation unit 27 refers to the association information in the storage unit 19, extracts visual adjustment information associated with the operation content (for example, press down operation performed only once for a short time) indicated by the operation information O, and transmits the visual adjustment information to the presentation signal generation unit 12 as visual adjustment information A (step S272').

The subsequent processing in steps S12, S121', S15', and S122' is as described in Modification 1 of the first embodiment.

Features of Second Embodiment

Even in this case, an effect same as that of the first embodiment can be obtained. Furthermore, pseudo haptic sense according to operation content can be presented by visual information being generated using visual adjustment information based on the operation content.

For example, in a case where different values of the same visual adjustment parameter are associated with different types of operation content in association information of the storage unit 19, a value of the visual adjustment parameter when the operation content is the first operation content can be made different from a value of the visual adjustment parameter when the operation content is the second operation content different from the first operation content. As a result, different types of pseudo haptic sense can be presented depending on whether the operation content is the first operation content or the second operation content.

For example, in a case where different visual adjustment parameters are associated with different types of operation content in the association information of the storage unit 19, a visual adjustment parameter when the operation content is the first operation content can be made different from a visual adjustment parameter when the operation content is the second operation content different from the first operation content. As a result, different types of pseudo haptic sense can be presented depending on whether the operation content is the first operation content or the second operation content.

Furthermore, in a case where there is a correlation between operation content and pseudo haptic sense presented by visual information based on visual adjustment information associated with the operation content in the association information of the storage unit 19, pseudo haptic sense having a correlation with the operation content can be presented.

Modification 1 of Second Embodiment

In a case where operation content stored in the association information of the storage unit 19 is operation content based on motion of a body part performed on the second operation device (not illustrated) other than the operation device 101, operation information O indicating the operation content is output from the second operation device when an operation based on motion of a body part is performed on the second operation device. Furthermore, when an operation based on motion of a body part is performed on the operation device 101, operation information $O_{in}$ indicating the operation content is output from the operation device 101. The operation information O and the operation information $O_{in}$ are transmitted to the input unit 14 and further transmitted to the operation detection unit 15. Other processing is the same as that in the second embodiment.

Third Embodiment

The present embodiment is a modification of the first embodiment, and is different from the first embodiment in that visual information is generated using visual adjustment information based on an operation state.

Configuration

As illustrated in FIG. 1, a pseudo haptic sense presentation device 3 of the present embodiment includes a visual information generation unit 11, a presentation signal generation unit 12, an output unit 13, an input unit 14, an operation detection unit 15, a state detection unit 36, a visual adjustment information generation unit 37, a control unit 18, and a storage unit 19, and performs each type of processing on the basis of control of the control unit 18. A hardware configuration of the pseudo haptic sense presentation device 3 will be described below. An operation device 101 is connected to the input unit 14 of the pseudo haptic sense presentation device 3 in a wired or wireless manner. A visual information presentation device 102 is connected to the output unit 13 of the pseudo haptic sense presentation device 3 in a wired or wireless manner. As described above, the operation device 101 and the visual information presentation device 102 may be any devices, but in the present embodiment, a case where the operation device 101 is a touch panel will be exemplified.

<div align="center">Processing</div>

In the present embodiment, as preprocessing, association information in which a plurality of operation states and visual adjustment information corresponding to each of the operation states are associated with each other (for example, the association information is a table) is stored in the storage unit 19. The operation states stored in the association information may be operation states based on motion of a body part performed on the operation device 101, or may be operation states based on motion of a body part performed on an operation device (second operation device) (not illustrated) other than the operation device 101. In the present embodiment, an example in which operation states based on motion of a body part performed on the operation device 101 is stored in the storage unit 19 will be described in order to simplify the description. However, this does not limit the present invention.

The plurality of operation states stored in the storage unit 19 may be any states. For example, a plurality of operation states having different speeds and/or strengths of operations for the operation device 101 may be stored in the storage unit 19. For example, in a case where the operation device 101 is a touch panel, operation states including a "slow operation state", a "quick operation state", a "strong force operation state", and a "weak force operation state" are stored. However, this does not limit the present invention.

The visual adjustment information associated with each of the plurality of types of operation content may be any visual adjustment information. However, the visual adjustment information associated with each of the plurality of types of operation content is not all the same, and at least any pieces of the visual adjustment information are different from each other.

For example, different values of the same visual adjustment parameter (for example, change delay amount) may be associated with different operation states. For example, for the same visual adjustment parameter (for example, change delay amount), a value of a visual adjustment parameter identified by visual adjustment information associated with a certain operation state (first operation state) may be different from a value of the visual adjustment parameter identified by visual adjustment information associated with another operation state (second operation state different from the first operation state).

Furthermore, for example, different visual adjustment parameters (for example, change delay amount and change duration amount) may be associated with different operation states. For example, a visual adjustment parameter identified by visual adjustment information associated with a certain operation state (first operation state) (for example, the parameter is a change delay amount) may be different from a visual adjustment parameter identified by visual adjustment information associated with another operation state (second operation state different from the first operation state) (for example, the parameter is a change duration amount).

Furthermore, there may be a correlation between operation states and pseudo haptic sense presented by visual information based on visual adjustment information associated with the operation states. For example, visual adjustment information corresponding to pseudo haptic sense in which at least one of weight feeling, stiffness feeling, or ruggedness feeling is smaller may be associated as an operation state is slower. For example, visual adjustment information in which the change delay amount and/or the change duration amount is smaller or visual adjustment information in which the change rate is larger may be associated as the operation state is slower. Furthermore, visual adjustment information corresponding to pseudo haptic sense in which at least one of weight feeling, stiffness feeling, or ruggedness feeling is larger may be associated as the operation state is stronger. For example, visual adjustment information in which the change delay amount and/or the change duration amount is larger or visual adjustment information in which the change rate is smaller may be associated as the force of the operation state is stronger.

When an operation based on motion of a body part is performed on the operation device 101, operation information O indicating the operation content and the operation state is output from the operation device 101. Among such operation information O, only operation information indicating specific operation content (for example, long pressing) is treated as the above-described operation information $O_{in}$ (operation information based on motion of a body part).

Figure 5:
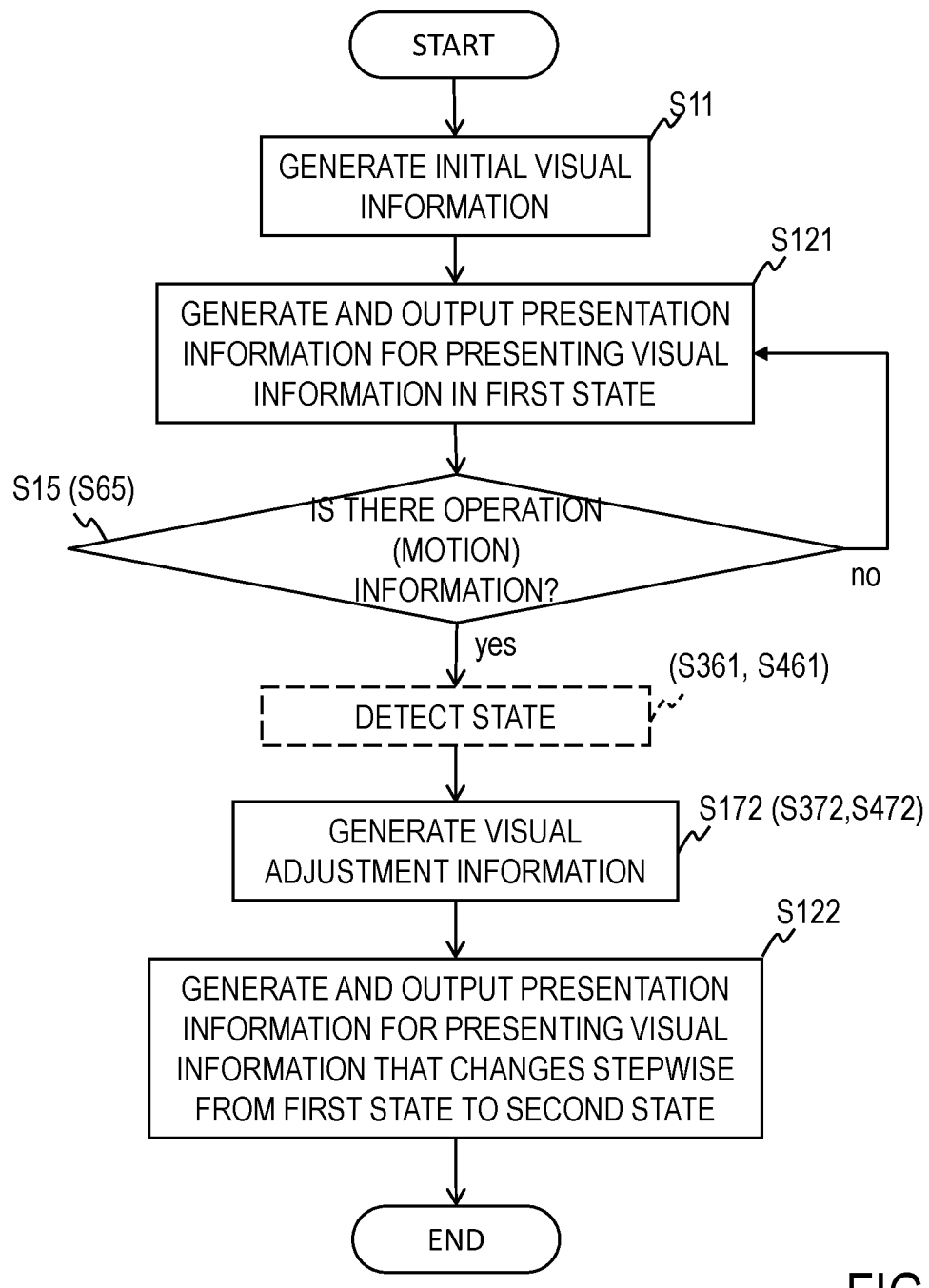
FIG. 5 is a flowchart for describing processing of the embodiment.

On the basis of the above premise, processing of the third embodiment will be described with reference to FIGS. 1 and 5.

First, processing of step S15 is performed after processing of steps S11 and S121 described in the first embodiment. However, the operation device 101 exemplified in the present embodiment is a physical key, and a user 100 can perform an operation (touch operation in the example of the present embodiment) on the operation device 101 using a finger. When an operation based on motion of a body part is performed on the operation device 101, operation information O indicating the operation content and the operation state is output from the operation device 101. The operation information O output from the operation device 101 is input to the input unit 14 of the pseudo haptic sense presentation device 1 and transmitted to the operation detection unit 15. Whether operation information $O_{in}$ (operation information O indicating specific operation content) is input is monitored. In a case of determining that the operation information $O_{in}$ has not been input in step S5, the control unit 18 returns the processing to step S121. On the other hand, in a case of determining that the operation information $O_{in}$ has been input, the operation detection unit 15 transmits a trigger signal T indicating that the operation information $O_{in}$ has been input to the visual adjustment information generation unit 37, and transmits the operation information O to the state detection unit 36.

The state detection unit 36 to which the operation information O is input extracts the operation state indicated by the operation information O and transmits information C indicating the operation state to the visual adjustment information generation unit 37 (step S361).

The visual adjustment information generation unit 37 refers to the association information in the storage unit 19, extracts visual adjustment information associated with the operation state (for example, slow operation state) indicated by the information C, and transmits the visual adjustment information to the presentation signal generation unit 12 as visual adjustment information A (step S372).

The subsequent processing in step S122 is as described in the first embodiment.

<div align="center">Features of Third Embodiment</div>

Even in this case, an effect same as that of the first embodiment can be obtained. Furthermore, pseudo haptic sense according to an operation state can be presented by visual information being generated using visual adjustment information based on the operation state.

For example, in a case where different values of the same visual adjustment parameter are associated with different operation states in the association information of the storage unit 19, a value of the visual adjustment parameter when the operation state is the first operation state can be made different from a value of the visual adjustment parameter when the operation state is the second operation state different from the first operation state. As a result, different types of pseudo haptic sense can be presented depending on whether the operation state is the first operation state or the second operation state.

For example, in a case where different visual adjustment parameters are associated with different operation states in the association information of the storage unit 19, a visual adjustment parameter when the operation state is the first operation state can be made different from a visual adjustment parameter when the operation state is the second operation state different from the first operation state. As a result, different types of pseudo haptic sense can be presented depending on whether the operation state is the first operation state or the second operation state.

Furthermore, in a case where there is a correlation between operation states and pseudo haptic sense presented by visual information based on visual adjustment information associated with the operation states in the association information of the storage unit 19, pseudo haptic sense having a correlation with the operation states can be presented.

Modification 1 of Third Embodiment

In a case where operation states stored in the association information of the storage unit 19 are operation states based on motion of a body part performed on the second operation device (not illustrated) other than the operation device 101, operation information O indicating the operation state is output from the second operation device when an operation based on motion of a body part is performed on the second operation device. Furthermore, when an operation based on motion of a body part is performed on the operation device 101, operation information $O_{in}$ indicating the operation state is output from the operation device 101. The operation information O and the operation information $O_{in}$ are transmitted to the input unit 14 and further transmitted to the operation detection unit 15. Other processing is the same as that in the third embodiment.

Fourth Embodiment

The present embodiment is a modification of the first embodiment, and is different from the first embodiment in that visual information is generated using visual adjustment information based on a state of a target device (device state).

Configuration

As illustrated in FIG. 1, a pseudo haptic sense presentation device 4 of the present embodiment includes a visual information generation unit 11, a presentation signal generation unit 12, an output unit 13, an input unit 14, an operation detection unit 15, a state detection unit 46, a visual adjustment information generation unit 47, a control unit 18, and a storage unit 19, and performs each type of processing on the basis of control of the control unit 18. A hardware configuration of the pseudo haptic sense presentation device 4 will be described below. An operation device 101 is connected to the input unit 14 of the pseudo haptic sense presentation device 4 in a wired or wireless manner. A visual information presentation device 102 is connected to the output unit 13 of the pseudo haptic sense presentation device 4 in a wired or wireless manner. As described above, the operation device 101 and the visual information presentation device 102 may be any devices, but in the present embodiment, a case where the operation device 101 is a physical key (for example, button of a remote controller) that is subject to a pressing operation by a finger of a user 100 will be described as an example.

Processing

In the present embodiment, as preprocessing, association information in which a plurality of device states (states of a target device) and visual adjustment information corresponding to each of the device states are associated with each other (for example, the association information is a table) is stored in the storage unit 19. The target device may be the pseudo haptic sense presentation device 4, a device including the pseudo haptic sense presentation device 4 (for example, remote controller having a physical key that is the operation device 101), or a device outside the pseudo haptic sense presentation device 4. Furthermore, the target device may be a device having a function correlated with the function of the pseudo haptic sense presentation device 4, or may be a device having a function not correlated with the function of the pseudo haptic sense presentation device 4.

The plurality of device states stored in the storage unit 19 may be any states. For example, a plurality of device states having different functional states and/or environments may be stored in the storage unit 19. For example, in a case where the device is a remote controller having a function of increasing the sound volume each time a button is pressed, device states including "sound volume" or "temperature" are stored. However, this does not limit the present invention.

The visual adjustment information associated with each of the plurality of device states may be any visual adjustment information. However, the visual adjustment information associated with each of the plurality of device states is not all the same, and at least any pieces of the visual adjustment information are different from each other.

For example, different values of the same visual adjustment parameter (for example, change delay amount) may be associated with different device states. For example, for the same visual adjustment parameter (for example, change delay amount), a value of the visual adjustment parameter identified by visual adjustment information associated with a certain device state (first state) may be different from a value of the visual adjustment parameter identified by visual adjustment information associated with another device state (second state different from the first state).

Furthermore, for example, different visual adjustment parameters (for example, change delay amount and change duration amount) may be associated with different device states. For example, a visual adjustment parameter identified by visual adjustment information associated with a certain device state (first state) (for example, the parameter is a change delay amount) may be different from a visual adjustment parameter identified by visual adjustment information associated with another device state (second state different from the first state) (for example, the parameter is a change duration amount).

Furthermore, there may be a correlation between device states and pseudo haptic sense presented by visual information based on visual adjustment information associated with the device states. For example, visual adjustment information corresponding to pseudo haptic sense in which at least one of weight feeling, stiffness feeling, or ruggedness feeling is larger may be associated as the device state is in a more shifted functional state (for example, functional state in which the button of the remote controller is pressed many times to increase the sound volume). For example, visual adjustment information in which the change delay amount and/or the change duration amount is larger or visual adjustment information in which the change rate is smaller may be associated as the device state is in a more shifted functional state. Furthermore, visual adjustment information corresponding to pseudo haptic sense in which at least one of weight feeling, stiffness feeling, or ruggedness feeling is larger may be associated as the device state is at higher temperature. For example, visual adjustment information in which the change delay amount and/or the change duration amount is larger or visual adjustment information in which the change rate is smaller may be associated as the device state is at higher temperature.

On the basis of the above premise, processing of the fourth embodiment will be described with reference to FIGS. 1 and 5.

First, the processing of step S15 is performed after the processing of steps S11 and S121 described in the first embodiment. However, in a case of determining that operation information $O_{in}$ has not been input in step S15, the control unit 18 returns the processing to step S121. On the other hand, in a case of determining that operation information $O_{in}$ has been input, the operation detection unit 15 transmits a trigger signal T indicating that the operation information $O_{in}$ has been input to the visual adjustment information generation unit 17 and the state detection unit 46.

The state detection unit 46 to which the trigger signal T is input detects the device state of the target device and transmits information C indicating the device state to the visual adjustment information generation unit 47 (step S461).

The visual adjustment information generation unit 47 refers to the association information in the storage unit 19, extracts visual adjustment information associated with the device state (for example, amount of sound volume) indicated by the information C, and transmits the visual adjustment information to the presentation signal generation unit 12 as visual adjustment information A (step S472).

The subsequent processing in step S122 is as described in the first embodiment.

Features of Fourth Embodiment

Even in this case, an effect same as that of the first embodiment can be obtained. Furthermore, pseudo haptic sense according to a device state can be presented by visual information being generated using visual adjustment information based on the device state.

For example, in a case where different values of the same visual adjustment parameter are associated with different device states in the association information of the storage unit 19, a value of the visual adjustment parameter when the device state is the first state can be made different from a value of the visual adjustment parameter when the device state is the second state different from the first state. As a result, different types of pseudo haptic sense can be presented depending on whether the device state is the first state or the second state.

For example, in a case where different visual adjustment parameters are associated with different device states in the association information of the storage unit 19, a visual adjustment parameter when the device state is the first state can be made different from a visual adjustment parameter when the device state is the second state different from the first state. As a result, different types of pseudo haptic sense can be presented depending on whether the device state is the first state or the second state.

Furthermore, in a case where there is a correlation between device states and pseudo haptic sense presented by visual information based on visual adjustment information associated with the device states in the association information of the storage unit 19, pseudo haptic sense having a correlation with the device states can be presented.

Modification 1 of Fourth Embodiment

As in Modification 1 of the first embodiment, visual adjustment information may be generated by a device state being detected and a presentation signal for presenting visual information that changes stepwise from the first state to the second state may be generated before operation information is input to the pseudo haptic sense presentation device.

Configuration

This is the same as the fourth embodiment.

Processing

Processing of the present modification will be described with reference to FIG. 7.

The state detection unit 46 detects the device state of the target device and transmits information C indicating the device state to the visual adjustment information generation unit 47 (step S461).

Next, after the processing in step S11 described in the first embodiment is performed, the visual adjustment information generation unit 47 refers to the association information in the storage unit 19, extracts visual adjustment information associated with the device state indicated by the information C, and transmits the visual adjustment information to the presentation signal generation unit 12 as visual adjustment information A (step S472').

The subsequent processing in steps S12, S121', S15', and S122' is as described in Modification 1 of the first embodiment.

Features of Modification 1 of Fourth Embodiment

Even in this case, an effect similar to that of the fourth embodiment can be obtained.

Fifth Embodiment

In the first to fourth embodiments and modifications thereof, when operation information based on motion of a body part of a user 100 is input, visual information in which a state representing at least any color attribute changes stepwise over time is presented to the user 100 on the basis of visual adjustment information. However, when operation information based on motion of a person other than the user 100, an animal, or a motion device (for example, robot or the like) is input, visual information in which a state representing at least any color attribute changes stepwise over time may be presented to the user 100 on the basis of visual adjustment information. Even in this case, if the user 100 is looking at the state of the operation together with the visual information, the user 100 perceives indirect pseudo haptic sense such as "appears to be heavy" or "appears to be stiff". Furthermore, such pseudo haptic sense can be also changed by at least one of the change delay amount, the change duration amount, or the change rate being controlled.

The fifth embodiment is different from the first to fourth embodiments and the modifications thereof only in that operation information based on motion of a body part of a person other than a user 100 or an animal or motion of a part of a motion device is input to the pseudo haptic sense presentation device instead of operation information based on motion of a body part of the user 100 being input to the pseudo haptic sense presentation device, and that the user 100 is looking at the state. Others are the same as those of the first to fourth embodiments and the modifications thereof.

Features of Fifth Embodiment

Even in this case, effects similar to those of the first to fourth embodiments and the modifications thereof can be obtained. However, pseudo haptic sense perceived by a user 100 is indirect pseudo haptic sense such as "appears to be heavy" or "appears to be stiff".

Sixth Embodiment

In the fifth embodiment, an example has been described in which, when operation information based on motion of a motion device is input, visual information in which a state representing at least any color attribute changes stepwise over time is presented to a user 100 on the basis of visual adjustment information. Furthermore, as this modification, when motion information for operating a motion device (for example, crane of a crane game) is output, visual information in which a state representing at least any color attribute changes stepwise over time may be presented to a user 100 on the basis of visual adjustment information. Even in such a case, the user 100 perceives indirect pseudo haptic sense such as "appears to be heavy" or "appears to be stiff". Furthermore, such pseudo haptic sense can be changed by at least one of the change delay amount, the change duration amount, or the change rate being controlled. For example, in a case where the motion device is a crane of a crane game, perception that the weight and stiffness of a gripped object are different can be caused by at least one of the change delay amount, the change duration amount, or the change rate of visual information presented to the user 100 being controlled when the crane grips the object. However, the change delay amount in this case corresponds to a time from the output of the motion information to start of a change in the state representing the color attribute.

Configuration

Figure 8:
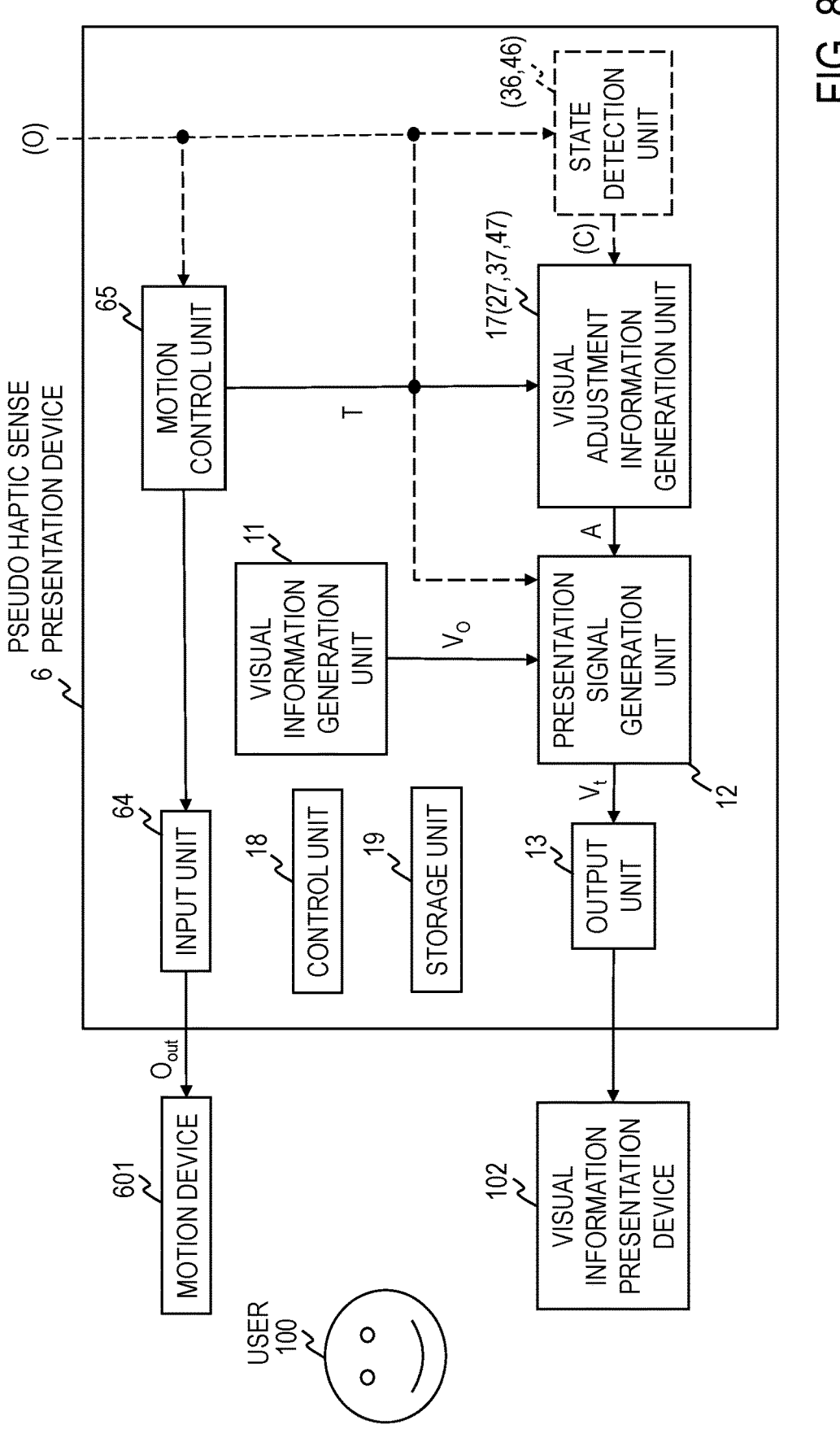
FIG. 8 is a block diagram for describing a functional configuration of a pseudo haptic sense presentation device according to an embodiment.

As illustrated in FIG. 8, a pseudo haptic sense presentation device 6 of the present embodiment includes an output unit 64 and a motion control unit 65 instead of the input unit 14 and the operation detection unit 15. Other configurations of the pseudo haptic sense presentation device 6 are the same as any of the pseudo haptic sense presentation devices 1 to 4 of the first to fourth embodiments.

A motion device 601 is connected to the output unit 64 of the pseudo haptic sense presentation device 6 in a wired or wireless manner. The motion device 601 may be any device as long as it performs motion. For example, the motion device 601 is a device that performs motion of applying a dynamic action to an object. The motion device 601 may perform a dynamic action in a state of being in contact with the object, or the motion device 601 may perform a dynamic action in a state of not being in contact with the object. Examples of the dynamic action applied to an object are gripping, pinching, lifting, pushing, pulling, compressing, stretching, moving, separating, connecting, and the like of an object. Specific examples of the motion device 601 include a robot and a crane of a game crane, but these do not limit the present invention.

Processing

Hereinafter, processing of the present embodiment will be described focusing on differences from processing of the first to fourth embodiments and the modifications thereof.

Differences From Processing of First Embodiment

The processing of the sixth embodiment based on the processing of the first embodiment will be described with reference to FIG. 5. In a case where the processing is based on the processing of the first embodiment, the processing of the sixth embodiment is as follows.

First, the processing of steps S11 and S121 described in the first embodiment is performed.

Next, following step S65 is performed instead of step S15. The motion control unit 65 controls operation of the motion device 601. When the motion control unit 65 does not output motion information $O_{out}$ for operating the motion device 601, a control unit 18 returns the processing to step S121. On the other hand, the motion control unit 65 can generate and output the motion information $O_{out}$ for operating the motion device 601 at any timing, predetermined timing, or designated timing. The output motion information $O_{out}$ is transmitted to the output unit 64 and further transmitted to the motion device 601. The motion device 601 performs motion based on the input motion information $O_{out}$. At this time, it is assumed that a user 100 is looking at an image (visual information) displayed on a visual information presentation device 102 and the motion of the motion device 601. The motion control unit 65 transmits a trigger signal T indicating that the motion information $O_{out}$ has been output to a visual adjustment information generation unit 17 (step S65).

When the trigger signal T is transmitted to the visual adjustment information generation unit 17, the visual adjustment information generation unit 17 generates visual adjustment information A for changing a state representing a color attribute of visual information being presented stepwise from the first state to the second state over time (step S172). A difference from the first embodiment is that (1) the change delay amount corresponds to a time from the output of the motion information $O_{out}$ to the start of the change in the state representing the color attribute of the visual information. Specific examples of (1) the change delay amount of the present embodiment are as follows.

A time De1' from when motion information $O_{out}$ is output from any one of the output unit 64 and the motion control unit 65 to when a change in a state representing a color attribute of presented visual information (step-wise change from the first state to the second state) is started.

A time De2' from when the motion device 601 performs motion based on motion information $O_{Out}$ to when a change in a state representing a color attribute of presented visual information is started.

Information by which the time De1' or De2' can be identified.

The subsequent processing in step S122 is as described in the first embodiment.

Differences From Processing of Modification 1 of First Embodiment

The processing of the sixth embodiment based on the processing of Modification 1 of the first embodiment will be described with reference to FIG. 7. In a case where the processing is based on the processing of Modification 1 of the first embodiment, the processing of the sixth embodiment is as follows.

First, processing of step S11, step S172', step S12, and step S121' described in Modification 1 of the first embodiment are performed.

Next, following step S65' is performed instead of step S15' described in Modification 1 of the first embodiment.

The motion control unit 65 controls operation of the motion device 601. When the motion control unit 65 does not output motion information $O_{out}$ for operating the motion device 601, the control unit 18 returns the processing to step S121'. On the other hand, the motion control unit 65 can generate and output the motion information $O_{out}$ for operating the motion device 601 at any timing, predetermined timing, or designated timing. The output motion information $O_{out}$ is transmitted to the output unit 64 and further transmitted to the motion device 601. The motion device 601 performs motion based on the input motion information $O_{out}$. At this time, it is assumed that a user 100 is looking at an image (visual information) displayed on a visual information presentation device 102 and the motion of the motion device 601. The motion control unit 65 transmits a trigger signal T indicating that the motion information $O_{out}$ has been output to a presentation signal generation unit 12 (step S65').

In a case where the trigger signal T is transmitted to the presentation signal generation unit 12, processing of step S122' described in Modification 1 of the first embodiment is performed.

Differences From Processing of Modification 1 of Second Embodiment

The processing of the sixth embodiment based on the processing of Modification 1 of the second embodiment will be described with reference to FIG. 7. In a case where the processing is based on the processing of Modification 1 of the second embodiment, the processing of the sixth embodiment is as follows.

First, the preprocessing described in the second embodiment is performed. On the premise of this, when an operation based on motion based on a body part is performed on a second operation device (not illustrated), operation information O indicating the operation content is output from the second operation device. The operation information O is transmitted to a visual adjustment information generation unit 27. Note that an operation based on a body part of a user 100 may be performed on the second operation device, or an operation based on a motion based on a body part of a person other than the user 100 or an animal may be performed. Examples of the second operation device include an operation device for controlling the motion device 601 (for example, operation device for operating a crane of a crane game). In this case, the operation information O may also be transmitted to the motion control unit 65, and the motion control unit 65 may generate and output motion information $O_{out}$ on the basis of the operation information O (step S261).

Thereafter, the processing of step S11 described in the first embodiment, processing of step S272' described in the second embodiment, and processing of steps S12 and S121' described in Modification 1 of the first embodiment are performed. Thereafter, processing of step S65' is performed. In a case where a trigger signal T is transmitted to the presentation signal generation unit 12, the processing of step S122' described in Modification 1 of the first embodiment is performed.

Differences From Processing of Modification 1 of Third Embodiment

The processing of the sixth embodiment based on the processing of Modification 1 of the third embodiment will be described with reference to FIG. 5. In a case where the processing is based on the processing of Modification 1 of the third embodiment, the processing of the sixth embodiment is as follows.

The preprocessing described in the third embodiment is performed. On the premise of this, processing of step S65 is performed after the processing of steps S11 and S121 described in the first embodiment. However, a trigger signal T output from the motion control unit 65 is transmitted to a visual adjustment information generation unit 37.

As described above, when an operation based on motion of a body part is performed on a second operation device (not illustrated), operation information O indicating the operation content and the operation state is output from the second operation device. Note that an operation based on a body part of a user 100 may be performed on the second operation device, or an operation based on a motion based on a body part of a person other than the user 100 or an animal may be performed. Examples of the second operation device include an operation device for controlling the motion device 601 (for example, operation device for operating a crane of a crane game). In this case, the operation information O may also be transmitted to the motion control unit 65, and the motion control unit 65 may generate and output motion information $O_{out}$ on the basis of the operation information O.

The operation information O output from the second operation device is input to a state detection unit 36, and processing of step S361 described in the third embodiment and processing of step S122 described in the first embodiment are performed.

Differences From Processing of Fourth Embodiment

The processing of the sixth embodiment based on the processing of the fourth embodiment will be described with reference to FIG. 5. In a case where the processing is based on the processing of the fourth embodiment, the processing of the sixth embodiment is as follows.

The preprocessing described in the fourth embodiment is performed. On the premise of this, the processing of step S65 is performed after the processing of steps S11 and S121 described in the first embodiment. However, a trigger signal T output from the motion control unit 65 is transmitted to a visual adjustment information generation unit 47 and a state detection unit 46.

The state detection unit 46 to which the trigger signal T is input detects the device state of the target device and transmits information C indicating the device state to the visual adjustment information generation unit 47. As described above, the target device may be any device, but an example of the target device is the motion device 601 (step S461).

Thereafter, processing of step S472 described in the fourth embodiment and the processing of step S122 described in the first embodiment are performed.

Differences From Processing of Modification 1 of Fourth Embodiment

The processing of the sixth embodiment based on the processing of Modification 1 of the fourth embodiment will be described with reference to FIG. 7. In a case where the processing is based on the processing of Modification 1 of the fourth embodiment, the processing of the sixth embodiment is as follows.

The preprocessing described in the fourth embodiment is performed. On the premise of this, the state detection unit 46 detects the device state of the target device and transmits information C indicating the device state to the visual adjustment information generation unit 47. As described above, the target device may be any device, but an example of the target device is the motion device 601 (step S461).

Next, the processing of step S11 described in the first embodiment, processing of step S472' described in Modification 1 of the fourth embodiment, and the processing of steps S12 and S121' described in Modification 1 of the first embodiment are performed. Thereafter, processing in step S65' described above is performed, and in a case where a trigger signal T is transmitted to the presentation signal generation unit 12, the processing of step S122' described in Modification 1 of the first embodiment is performed.

Features of Sixth Embodiment

Even in this case, effects similar to those of the first to fourth embodiments and the modifications thereof can be obtained. However, pseudo haptic sense perceived by a user 100 is indirect pseudo haptic sense such as "appears to be heavy" or "appears to be stiff".

[Hardware Configuration]

The pseudo haptic sense presentation device 1-4, 6 according to each embodiment is a device formed with a general-purpose or dedicated computer executing a predetermined program, the computer including a processor (a hardware processor) such as a central processing unit (CPU) and a memory such as a random access memory (RAM) and a read only memory (ROM), for example. That is, the pseudo haptic sense presentation device 1-4, 6 in each embodiment include processing circuitry designed to implement the respective components included in the respective function transform devices. The computer may include one processor and one memory, or may include a plurality of processors and a plurality of memories. The program may be installed in the computer, or may be recorded in a ROM or the like in advance. Also, some or all of the processing units may be formed with an electronic circuit that independently implements the processing functions, rather than an electronic circuit (circuitry) that forms the functional components by reading the program like a CPU. Also, an electronic circuit forming one device may include a plurality of CPUs.

Figure 9:
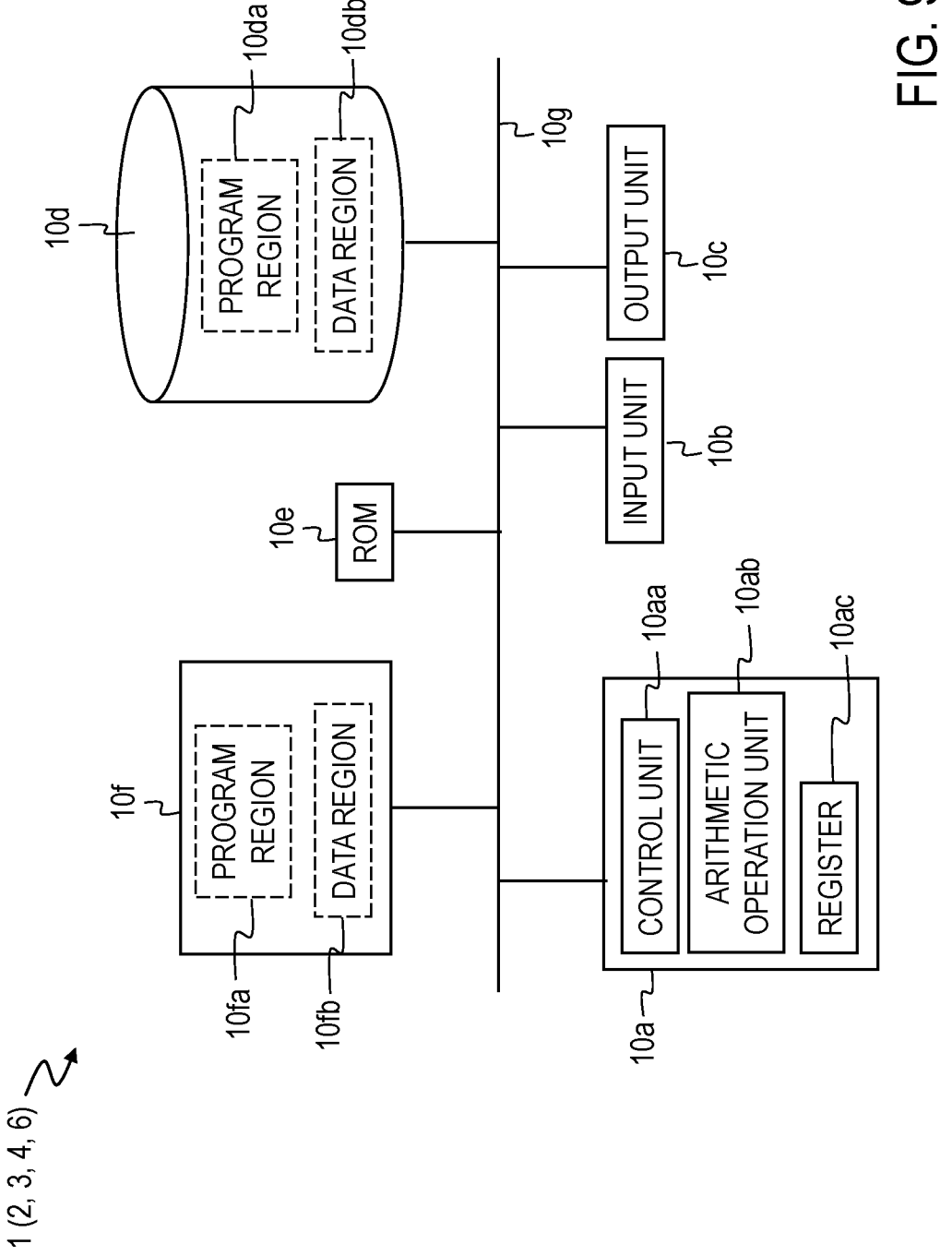
FIG. 9 is a block diagram illustrating a hardware configuration of the pseudo haptic sense presentation device of the present embodiment.

FIG. 9 is a block diagram illustrating an example hardware configuration of the pseudo haptic sense presentation device 1-4, 6 according to each embodiment. As illustrated as the example in FIG. 9, the pseudo haptic sense presentation device 1-4, 6 in this example includes a central processing unit (CPU) 10*a*, an input unit 10*b*, an output unit 10*c*, a random access memory (RAM) 10*d*, a read only memory (ROM) 10*e*, an auxiliary storage device 10*f*, and a bus 10*g*. The CPU 10*a* in this example includes a control unit 10*aa*, an arithmetic operation unit 10*ab*, and a register 10*ac*, and performs various arithmetic operations in accordance with various programs read into the register 10*ac*. Meanwhile, the input unit 10*b* is an input terminal to which data is input, a keyboard, a mouse, a touch panel, or the like. Also, the output unit 10*c* is an output terminal from which data is output, a display, a LAN card or the like controlled by the CPU 10*a* that has read a predetermined program. Further, the RAM 10*d* is a static random access memory (SRAM), a dynamic random access memory (DRAM), or the like, and incudes a program region 10*da* in which a predetermined program is stored and a data region 10*db* in which various kinds of data are stored. Further, the auxiliary storage device 10*f* is a hard disk, a magneto-optical disc (MO), a semiconductor memory, or the like, for example, and includes a program region 10*fa* in which a predetermined program is stored and a data region 10*fb* in which various kinds of data are stored. Meanwhile, the bus 10*g* connects the CPU 10*a*, the input unit 10*b*, the output unit 10*c*, the RAM 10*d*, the ROM 10*e*, and the auxiliary storage device 10*f* so that information can be exchanged among these components. The CPU 10*a* writes, into the program region 10*da* of the RAM 10*d*, the program stored in the program region 10*fa* of the auxiliary storage device 10*f*, in accordance with a read operating system (OS) program. Likewise, the CPU 10*a* writes, into the data region 10*db* of the RAM 10*d*, the various kinds of data stored in the data region 10*fb* of the auxiliary storage device 10*f*. The addresses in the RAM 10*d* at which the program and the data are written are stored into the register 10*ac* of the CPU 10*a*. The control unit 10*aa* of the CPU 10*a* sequentially reads these addresses stored in the register 10*ac*, reads the program and the data from the regions in the RAM 10*d* indicated by the read addresses, causes the arithmetic operation unit 10*ab* to sequentially execute arithmetic operations indicated by the program, and stores results of the arithmetic operations into the register 10*ac*. With such a configuration, the functional components of the pseudo haptic sense presentation device 1-4, 6 are obtained.

The program mentioned above can be recorded in a computer-readable recording medium. The computer-readable recording medium in an example is a non-transitory recording medium. Examples of such a recording medium include a magnetic recording device, an optical disc, a magneto-optical recording medium, and a semiconductor memory.

The program is distributed by selling, giving, or renting portable recording media such as DVDs or CD-ROMs recording the program thereon, for example. Furthermore, a configuration in which the program is stored in a storage device in a server computer and the program is distributed by transferring the program from the server computer to other computers via a network may also be employed. As described above, the computer executing such a program first stores the program recorded in the portable recording medium or the program transferred from the server computer temporarily into a storage device of the computer, for example. The computer then reads the program stored in the storage device itself, and performs a process in accordance with the read program at the time of execution of the process. Also, in other performance modes of the program, the computer may read the program directly from the portable recording medium and performs processing in accordance with the program, or alternatively, the computer may sequentially perform processing in accordance with the received program every time the program is transferred from the server computer to the computer. Alternatively, the above processing may be performed by a so-called application service provider (ASP) service that implements a processing function only by issuing an instruction to perform the program and acquiring the result, without transferring the program from the server computer to the computer. Note that the program in this mode includes information that is to be used in processing by an electronic computer and is equivalent to the program (data and the like that are not direct commands to the computer but have properties that define the processing to be performed by the computer).

Although this device is formed with a computer executing a predetermined program in each embodiment, at least some of the processing contents may be realized by hardware.

Other Modifications and Like

Note that the present invention is not limited to the embodiments described above. For example, in the above-described embodiments, the operation device 101 and the visual information presentation device 102 are provided outside the pseudo haptic sense presentation device 1-4. However, the operation device 101 may be provided in the pseudo haptic sense presentation device 1-4, or the visual information presentation device 102 may be provided in the pseudo haptic sense presentation device 1-4. Similarly, the motion device 601 may be provided in the pseudo haptic sense presentation device 6, or the visual information presentation device 102 may be provided in the pseudo haptic sense presentation device 6.

In the above embodiments, the case where the operation device 101 is a physical key or a touch panel has been described as an example. However, this is merely an example, and any device may be used as the operation device 101 as long as the device detects an operation based on motion of a body part (for example, hand, finger, foot, head, face, eye, or the like) of a user 100, a person other than the user, or an animal or a motion device and outputs operation information indicating that the operation has been performed (operation information based on motion). For example, besides a physical key such as a keyboard and a touch panel, a pull tab, a knob, a fader, a mouse, a pedal, or the like may be used as the operation device 101. Examples of an operation based on motion by these include pressing down, pulling, rotating, sliding, dragging, clicking, swiping, pinching, stepping, and the like. Furthermore, a device that detects virtual pressing down, pulling, dragging, clicking, swiping, pinching, stepping, and the like by detecting contact with a physical surface such as a table or a floor by a touch detection technology using a camera, an electrostatic sensor, or the like may be used as the operation device 101. Furthermore, in the above-described embodiments, the case of using the operation device 101 that detects an operation performed in a state where a body part of a user 100 is in contact with an object has been exemplified, but this does not limit the present invention. That is, the operation device 101 that detects an operation based on motion of a body part or a part of a motion device without the body part or the part of the motion device coming into contact with an object and outputs operation information indicating that the operation has been performed (operation information based on motion) may be used. For example, a device that detects an operation by motion of a body part such as shaking a hand, nodding, moving an eyeball, or blinking, or an operation by motion of a part of the motion device such as grasping, moving, or rotating may be used as the operation device 101. Examples of such an operation device 101 include a device that tracks motion of a body part using a motion sensor such as an acceleration sensor or a gyro sensor, and an eye tracker that detects motion of an eye by a known eye tracking technology such as a corneal reflex method, a dark pupil method, or a stereo image method. For example, any device may be used as the operation device 101 as long as the device detects an operation based on motion of a body part in which the intention (for example, some ON/OFF intention) of a user 100 appears as operation information based on motion of a body part of the user 100 and outputs operation information indicating that the operation has been performed (operation information based on motion).

In the above-described embodiments, the case where visual information is an image has been described as an example. However, this is an example and does not limit the present invention. That is, the visual information may be any information indicating a color attribute. For example, besides an image, light emitting diode (LED) light, laser light, a projection image, a hologram, a retinal projection image, or the like may be visual information. Furthermore, the visual information may be information indicating a single color or information indicating a pattern including a plurality of colors (for example, noise image).

As described above, a "state representing the color attribute" may be a state of the color attribute itself, or may be a state for causing perception of an apparent color attribute. "Visual information in which a state representing the color attribute changes stepwise over time" may be visual information in which the color attribute itself changes stepwise over time, may be visual information in which the apparent color attribute (that is, perceived color attribute) changes stepwise over time due to a change in the number of pieces of information presented per unit area (for example, number of display pixels, number of LED light emission, number of laser light irradiation, and the like), or may be visual information in which the apparent color attribute changes stepwise over time by another method.

In the above-described embodiments, the case where the visual information presentation device 102 is a display has been described as an example. However, this is an example and does not limit the present invention. That is, any device may be used as the visual information presentation device 102 as long as the device presents (for example, displays) visual information indicating a color attribute. For example, besides a display, a touch panel, virtual reality (VR) goggles, an LED, a laser light irradiation device, a projector, a 3D hologram display, a retina projection device, or the like may be used as the visual information presentation device 102.

There is no restriction on the spatial positional relationship between the visual information presentation device 102 and the operation device 101. For example, the visual information presentation device 102 may be a liquid crystal display, an LED, or the like provided in the operation device 101 such as a physical key, a knob, or a fader, may be integrally formed with the operation device 101 such as a touch panel, may be a liquid crystal display physically independent of the operation device 101, or may be a projector that projects an image on a surface such as a table.

The visual information presentation device 102 may present visual information at a position corresponding to the operation position of the operation device 101, or may present visual information at a position uncorrelated with the operation position. For example, in a case where the operation device 101 and the visual information presentation device 102 are touch panels, visual information may be presented at a touch position of the touch panel by a finger or a position of the touch panel corresponding to the position or operation, or visual information may be presented at a position irrelevant to the touch position. Furthermore, for example, in a case where the operation device 101 is a physical key, the visual information presentation device 102 may be an LED provided on the physical key, or may be a liquid crystal display independent of the physical key.

The operation device 101 and the visual information presentation device 102 may or may not be linked with each other for functions other than the above-described function of causing perception of pseudo haptic sense. For example, in a case where the operation device 101 is an operation button (physical key) of a remote controller, the visual information presentation device 102 may be a liquid crystal screen or a television screen that displays operation content by the remote controller, or the visual information presentation device 102 may be a liquid crystal display unrelated to the remote controller.

Information instructing a user 100 who has started an operation based on the body part on the operation device 101 to continue the operation may be presented from the visual information presentation device 102 until presented visual information changes from the first state to the second state. In a case where an operation is interrupted before presented visual information enters the second state after a user starts the operation based on the body part on the operation device 101, visual information (visual information in which the state representing at least any color attribute changes stepwise over time) may be presented again.

In addition to the state representing at least any color attribute of presented visual information changing stepwise over time, the shape of the visual information may also change.

Also, the aforementioned various kinds of processing may be performed not only in a chronological manner in accordance with the description but also in parallel or individually in accordance with the processing ability of the devices that perform the processing or as needed. It is needless to say that appropriate modifications can be made without departing from the gist of the present invention.

REFERENCE SIGNS LIST

1-4, 6 Pseudo haptic sense presentation device
12 Presentation signal generation unit
36, 46 State detection unit
17, 27, 37, 47 Visual adjustment information generation unit
101 Operation device
601 Motion device
102 Visual information presentation device

The invention claimed is:

1. A pseudo haptic sense presentation device comprising processing circuitry configured to control a visual adjustment parameter of visual information in which a state representing at least any color attribute changes stepwise over time on a basis of visual adjustment information regardless of spatial correspondence between motion and presented information, and generate a presentation signal for presenting the visual information, when operation information based on the motion is input, wherein the visual adjustment parameter is at least one of:

a change delay amount corresponding to a time from when the operation information is input to when a change in the state is started, a change duration amount corresponding to a time from start to end of a change in the state, or a change rate corresponding to a change amount per unit time of the state.

2. The pseudo haptic sense presentation device according to claim 1, wherein the operation information is information based on motion of a body part.

3. The pseudo haptic sense presentation device according to claim 2, wherein the operation information is information based on an operation performed in a state where the body part is in contact with an object.

4. The pseudo haptic sense presentation device according to any one of claims 1 to 3, wherein the visual adjustment information is information based on operation content, and a value of the visual adjustment parameter when the operation content is first operation content is different from a value of the visual adjustment parameter when the operation content is second operation content different from the first operation content, and/or the visual adjustment parameter when the operation content is the first operation content is different from the visual adjustment parameter when the operation content is the second operation content.

5. The pseudo haptic sense presentation device according to any one of claims 1 to 3, wherein the visual adjustment information is information based on an operation state, and at least one of following holds:

a first value of the visual adjustment parameter during a first operation state of the operation state is distinct from a second value of the visual adjustment parameter during a second operation of the operation state, and the second operation state is distinct from the first operation state, or a first visual adjustment parameter during the first operation state of the operation state is distinct from a second visual adjustment parameter during the second operation state of the operation state, and the second operation state is distinct from the first operation state.

6. The pseudo haptic sense presentation device according to any one of claims 1 to 3, wherein the visual adjustment information is information based on a device state, and at least one of following holds:

a value of the visual adjustment parameter when the device state is a first state is different from a value of the visual adjustment parameter when the device state is a second state different from the first state, or the visual adjustment parameter when the device state is the first state is different from the visual adjustment parameter when the device state is the second state.

7. The pseudo haptic sense presentation device according to any one of claims 1 to 3, wherein the state changes stepwise from a first state to a second state over time, and at least one of the first state or the second state is fixed to a specific state regardless of the visual adjustment information.

8. The pseudo haptic sense presentation device according to any one of claims 1 to 3, wherein perception of different types of pseudo haptic sense is caused according to a difference in the visual adjustment parameter by the visual information being presented.

9. The pseudo haptic sense presentation device according to claim 8, wherein at least one of following holds:

perception of the pseudo haptic sense that is larger is caused as the change delay amount is larger, perception of the pseudo haptic sense that is larger is caused as the change duration amount is larger, or perception of the pseudo haptic sense that is larger is caused as the change rate is smaller.

10. The pseudo haptic sense presentation device according to any one of claims 1 to 3, wherein the visual adjustment information is the change delay amount.

11. A pseudo haptic sense presentation method comprising a presentation signal generation step of controlling a visual adjustment parameter of visual information in which a state representing at least any color attribute changes stepwise over time on a basis of visual adjustment information regardless of spatial correspondence between motion of a motion device and presented information, and generate a presentation signal for presenting the visual information, when motion information for operating the motion device is output, wherein the visual adjustment parameter is at least one of:

a change delay amount corresponding to a time from when the motion information is output to when a change in the state is started;

a change duration amount corresponding to a time from start to end of a change in the state; or a change rate corresponding to a change amount per unit time of the state.

12. A pseudo haptic sense presentation device comprising processing circuitry configured to control a visual adjustment parameter of visual information in which a state representing at least any color attribute changes stepwise over time on a basis of visual adjustment information regardless of spatial correspondence between motion of a motion device and presented information, and generate a presentation signal for presenting the visual information, when motion information for operating the motion device is output, wherein the visual adjustment parameter is at least one of:

a change delay amount corresponding to a time from when the motion information is output to when a change in the state is started, a change duration amount corresponding to a time from start to end of a change in the state, or a change rate corresponding to a change amount per unit time of the state.

13. A pseudo haptic sense presentation method comprising a presentation signal generation step of controlling a visual adjustment parameter of visual information in which a state representing at least any color attribute changes stepwise over time on a basis of visual adjustment information regardless of spatial correspondence between motion and presented information, and generate a presentation signal for presenting the visual information, when operation information based on the motion is input, wherein the visual adjustment parameter is at least one of:

a change delay amount corresponding to a time from when the operation information is input to when a change in the state is started;

a change duration amount corresponding to a time from start to end of a change in the state; or a change rate corresponding to a change amount per unit time of the state.

14. The pseudo haptic sense presentation method according to claim 12 or 13, wherein perception of different types of pseudo haptic sense is caused according to a difference in the visual adjustment parameter by the visual information being presented.

15. The pseudo haptic sense presentation method according to claim 14, wherein perception of the pseudo haptic sense that is larger is caused as the change delay amount is larger, and/or perception of the pseudo haptic sense that is larger is caused as the change duration amount is larger, and/or perception of the pseudo haptic sense that is larger is caused as the change rate is smaller.

16. The pseudo haptic sense presentation method according to claim 12 or 13, wherein the visual adjustment information is the change delay amount.

17. A non-transitory computer-readable recording medium storing a program for causing a computer to function as the pseudo haptic sense presentation device according to any one of claims 1 to 3.

\* \* \* \* \*